US 8,615,121 B2

(12) United States Patent
Pack et al.

(10) Patent No.: US 8,615,121 B2
(45) Date of Patent: Dec. 24, 2013

(54) RECONSTRUCTION OF PROJECTION DATA TO GENERATE TOMOGRAPHIC IMAGES HAVING IMPROVED FREQUENCY CHARACTERISTICS

(75) Inventors: Jed Douglas Pack, Glenville, NY (US); Kai Zeng, Clifton Park, NY (US); Zhye Yin, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 13/149,734

(22) Filed: May 31, 2011

(65) Prior Publication Data

US 2012/0308102 A1    Dec. 6, 2012

(51) Int. Cl.
*G06K 9/00* (2006.01)

(52) U.S. Cl.
USPC ......................................................... 382/131

(58) Field of Classification Search
USPC .................. 382/100, 128–132, 260; 378/4
See application file for complete search history.

(56) References Cited

U.S. PATENT DOCUMENTS

| | | | |
|---|---|---|---|
| 6,148,056 A | 11/2000 | Lin et al. | |
| 6,839,400 B2 | 1/2005 | Bruder et al. | |
| 6,983,034 B2 | 1/2006 | Wang et al. | |
| 6,990,167 B2 | 1/2006 | Chen | |
| 7,359,478 B2 | 4/2008 | Zamyatin et al. | |
| 7,602,184 B2 * | 10/2009 | Du | 324/309 |
| 7,643,605 B2 | 1/2010 | Ning et al. | |
| 7,751,524 B2 | 7/2010 | Horiuchi et al. | |
| 7,848,479 B1 | 12/2010 | Katsevich | |
| 2005/0073303 A1 * | 4/2005 | Harer et al. | 324/307 |
| 2006/0104407 A1 | 5/2006 | Zamyatin et al. | |
| 2006/0104409 A1 | 5/2006 | Bouman et al. | |
| 2006/0140338 A1 * | 6/2006 | Bruder et al. | 378/15 |
| 2006/0235293 A1 * | 10/2006 | Raupach et al. | 600/425 |
| 2006/0291611 A1 | 12/2006 | Pack et al. | |
| 2008/0285827 A1 * | 11/2008 | Meyer et al. | 382/131 |
| 2009/0028288 A1 | 1/2009 | Horiuchi et al. | |
| 2009/0207964 A1 * | 8/2009 | Pack | 378/4 |
| 2009/0270738 A1 * | 10/2009 | Izatt et al. | 600/476 |
| 2010/0135454 A1 | 6/2010 | Noo | |

(Continued)

FOREIGN PATENT DOCUMENTS

| | | |
|---|---|---|
| DE | 102009014727 A1 | 9/2010 |
| WO | 03015634 A1 | 2/2003 |

(Continued)

OTHER PUBLICATIONS

Kachelrieb, M., et al.; "Extended parallel backprojection for standard three-dimensional and phase-correlated four dimensional axial and spiral cone-beam CT with arbitrary pitch, arbitrary cone-angle, and 100% dose usage", Medical Physics, vol. 31, No. 6, pp. 1623-1641, May 27, 2004.

(Continued)

*Primary Examiner* — Andrew W Johns
*Assistant Examiner* — Tahmina Ansari
(74) *Attorney, Agent, or Firm* — Fletcher Yoder, P.C.

(57) ABSTRACT

Algorithms are disclosed that recombine acquired data so as to generate a substantially uniform and complete set of frequency data where frequency data might otherwise be incomplete. This process, or its equivalent, may be accomplished in a computationally efficient manner using filtering steps in one or both of the reconstruction space and/or the post-processing space.

26 Claims, 17 Drawing Sheets

(56) References Cited

U.S. PATENT DOCUMENTS

| | | |
|---|---|---|
| 2010/0158194 A1 | 6/2010 | Pack et al. |
| 2010/0177862 A1 | 7/2010 | Bruder et al. |
| 2011/0033097 A1 | 2/2011 | Bruder et al. |
| 2011/0058724 A1* | 3/2011 | Claus ............................ 382/132 |
| 2011/0150305 A1* | 6/2011 | Zeng et al. .................... 382/131 |

FOREIGN PATENT DOCUMENTS

| | | |
|---|---|---|
| WO | 03094736 A1 | 11/2003 |
| WO | 2004070661 A1 | 8/2004 |
| WO | 2006073584 A1 | 8/2006 |
| WO | 2006085242 A1 | 8/2006 |
| WO | 2006120611 A1 | 11/2006 |

OTHER PUBLICATIONS

Lee, Seung Wook, et al.; "Grangeat-type helical half-scan computerized tomography algorithm for reconstruction of a short object", Med. Phys. 31(1), Jan. 2004, pp. 4-16.

Yin Zhye et al.; "3D Analytic Cone-Beam Reconstruction for Multiaxial CT Acquisitions", International Journal of Biomedical Imaging, vol. 2009, Article ID 538389, 11 pgs.

Lu, Yang, et al.; "Exact image reconstruction with triple-source saddle-curve cone-beam scanning", Physics in Medicine and Biology, vol. 54, pp. 2971-2991 (2009).

* cited by examiner

RECONSTRUCTION OF PROJECTION DATA TO GENERATE TOMOGRAPHIC IMAGES HAVING IMPROVED FREQUENCY CHARACTERISTICS

BACKGROUND

Non-invasive imaging technologies allow images of the internal structures of a patient or object to be obtained without performing an invasive procedure on the patient or object. In particular, technologies such as computed tomography (CT) use various physical principles, such as the differential transmission of X-rays through the target volume, to acquire image data and to construct tomographic images (e.g., three-dimensional representations of the interior of the human body or of other imaged structures). However, various physical limitations or constraints on acquisition may result in artifacts or other imperfections in the reconstructed image.

For example, third-generation cone-beam CT may suffer from cone-beam artifacts, particularly in the case of axial (circular) scan trajectories. These artifacts may arise from a variety of causes, such as truncation of data in the Z-direction (i.e., in the direction corresponding to the axis about which the X-ray source rotates about the patient), mishandled data, and/or missing frequencies.

BRIEF DESCRIPTION

In one embodiment, a method of image data processing is provided. In accordance with this method, an initial subset of a fullscan axial projection dataset is reconstructed to generate a preliminary image. The preliminary image is filtered to preserve a subset of the frequencies that is the most uniformly weighted to produce a partial reconstruction. The acts of reconstruction and generating are repeated at shifted view ranges a specified number of times to generate a set of partial reconstructions. The set of partial reconstructions are combined to generate an intermediate volume with substantially complete frequency data. Corresponding computer-readable media and system embodiments are also provided.

In another embodiment, a method for processing image data is provided. In accordance with this method, a plurality of limited view angle reconstructions are reconstructed. The plurality of limited view angle reconstructions are summed to generate a full-scan reconstruction. Half of the limited view angle reconstructions are subtracted from their conjugates prior to applying one of a plurality of first filters to generate filtered volumes. The filtered volumes are combined to generate an intermediate volume. A temporal windowing volume is generated from the intermediate volume. The full-scan reconstruction is combined with the temporal windowing volume. Corresponding computer-readable media and system embodiments are also provided.

In another embodiment, a method for processing image data is provided. In accordance with this method, a fullscan axial projection dataset is accessed comprising a pair of views for every frequency direction for every voxel to be reconstructed. For each pair of views associated with each voxel and frequency direction, a respective view that is closer in proximity to a particular view is selected and each respective pair of views is processed such that the respective view that is selected has a greater contribution in a corresponding reconstructed voxel. Corresponding computer-readable media and system embodiments are also provided.

BRIEF DESCRIPTION OF THE DRAWINGS

These and other features and aspects of embodiments of the present invention will become better understood when the following detailed description is read with reference to the accompanying drawings in which like characters represent like parts throughout the drawings, wherein.

DETAILED DESCRIPTION

Embodiments disclosed herein provide algorithms for the reconstruction of images from data collected using cone-beam computed tomography (CT). The algorithms address artifacts attributable to one or more of truncation of data in the z-direction, mishandled data due to incorrect weighting of data redundancy, and/or missing frequency data. In one example of such an approach, the algorithm performs the equivalent of reconstructing an image from an initial set of data from a 180 degree view range. The image may be filtered to select frequencies from a 45 degree range. The view range may be shifted by 45 degrees and these steps repeated until four partial reconstructions are acquired. This process may be repeated to generate four additional reconstructions that are complementary to the first four, such that the union of the two view ranges is the entire 360 degree view range. In practice this process, or its equivalent, may be accomplished in a computationally efficient manner using filtering steps in one or both of the reconstruction space and/or the post-processing space. In addition, computationally, this process or its equivalent may be accomplished using logical constructs that yield the same result as intermediate partial reconstructions, such as a full-scan reconstruction and a conjugate discrepancy or difference volume.

The approaches disclosed herein may be suitable for use with a range of tomographic reconstruction systems. To facilitate explanation, the present disclosure will primarily discuss the present reconstruction approaches in the context of a CT system. However, it should be understood that the following discussion may also be applicable to other tomographic reconstruction systems.

Figure 1:
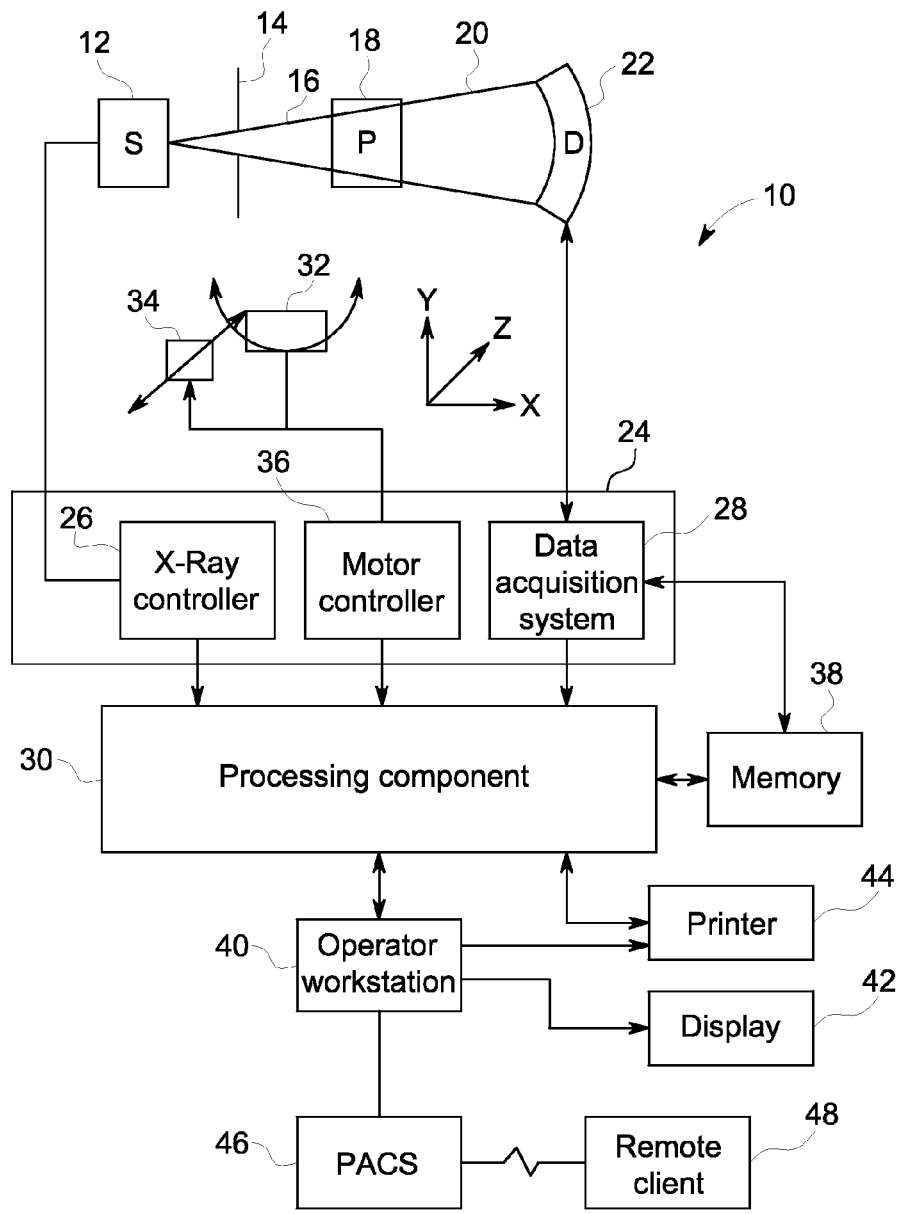
FIG. 1 is a diagrammatical view of a CT imaging system for use in producing images in accordance with aspects of the present disclosure.

With this in mind, an example of a computer tomography (CT) imaging system 10 designed to acquire X-ray attenuation data at a variety of views around a patient (or other subject or object of interest) and suitable for tomographic reconstruction is provided in FIG. 1. In the embodiment illustrated in FIG. 1, imaging system 10 includes a source of X-ray radiation 12 positioned adjacent to a collimator 14. The X-ray source 12 may be an X-ray tube, a distributed X-ray source (such as a solid-state or thermionic X-ray source) or any other source of X-ray radiation suitable for the acquisition of medical or other images.

The collimator 14 permits X-rays 16 to pass into a region in which a patient 18, is positioned. In the depicted example, the X-rays 16 are collimated to be a cone-shaped beam, i.e., a cone-beam, that passes through the imaged volume. A portion of the X-ray radiation 20 passes through or around the patient 18 (or other subject of interest) and impacts a detector array, represented generally at reference numeral 22. Detector elements of the array produce electrical signals that represent the intensity of the incident X-rays 20. These signals are acquired and processed to reconstruct images of the features within the patient 18.

Source 12 is controlled by a system controller 24, which furnishes both power, and control signals for CT examination sequences. In the depicted embodiment, the system controller 24 controls the source 12 via an X-ray controller 26 which may be a component of the system controller 24. In such an embodiment, the X-ray controller 26 may be configured to provide power and timing signals to the X-ray source 12.

Moreover, the detector 22 is coupled to the system controller 24, which controls acquisition of the signals generated in the detector 22. In the depicted embodiment, the system controller 24 acquires the signals generated by the detector using a data acquisition system 28. The data acquisition system 28 receives data collected by readout electronics of the detector 22. The data acquisition system 28 may receive sampled analog signals from the detector 22 and convert the data to digital signals for subsequent processing by a processor 30 discussed below. Alternatively, in other embodiments the digital-to-analog conversion may be performed by circuitry provided on the detector 22 itself. The system controller 24 may also execute various signal processing and filtration functions with regard to the acquired image signals, such as for initial adjustment of dynamic ranges, interleaving of digital image data, and so forth.

In the embodiment illustrated in FIG. 1, system controller 24 is coupled to a rotational subsystem 32 and a linear positioning subsystem 34. The rotational subsystem 32 enables the X-ray source 12, collimator 14 and the detector 22 to be rotated one or multiple turns around the patient 18, such as rotated primarily in an x,y-plane about the patient. It should be noted that the rotational subsystem 32 might include a gantry upon which the respective X-ray emission and detection components are disposed. Thus, in such an embodiment, the system controller 24 may be utilized to operate the gantry.

The linear positioning subsystem 34 may enable the patient 18, or more specifically a table supporting the patient, to be displaced within the bore of the CT system 10, such as in the z-direction relative to rotation of the gantry. Thus, the table may be linearly moved (in a continuous or step-wise fashion) within the gantry to generate images of particular areas of the patient 18. In the depicted embodiment, the system controller 24 controls the movement of the rotational subsystem 32 and/or the linear positioning subsystem 34 via a motor controller 36.

In general, system controller 24 commands operation of the imaging system 10 (such as via the operation of the source 12, detector 22, and positioning systems described above) to execute examination protocols and to process acquired data. For example, the system controller 24, via the systems and controllers noted above, may rotate a gantry supporting the source 12 and detector 22 about a subject of interest so that X-ray attenuation data may be obtained at a variety of views relative to the subject. In the present context, system controller 24 may also includes signal processing circuitry, associated memory circuitry for storing programs and routines executed by the computer (such as routines for executing image processing techniques described herein), as well as configuration parameters, image data, and so forth.

In the depicted embodiment, the image signals acquired and processed by the system controller 24 are provided to a processing component 30 for reconstruction of images. The processing component 30 may be one or more conventional microprocessors. The data collected by the data acquisition system 28 may be transmitted to the processing component 30 directly or after storage in a memory 38. Any type of memory suitable for storing data might be utilized by such an exemplary system 10. For example, the memory 38 may include one or more optical, magnetic, and/or solid state memory storage structures. Moreover, the memory 38 may be located at the acquisition system site and/or may include remote storage devices for storing data, processing parameters, and/or routines for image reconstruction, as described below.

The processing component 30 may be configured to receive commands and scanning parameters from an operator via an operator workstation 40, typically equipped with a keyboard and/or other input devices. An operator may control the system 10 via the operator workstation 40. Thus, the operator may observe the reconstructed images and/or otherwise operate the system 10 using the operator workstation 40. For example, a display 42 coupled to the operator workstation 40 may be utilized to observe the reconstructed images and to control imaging. Additionally, the images may also be printed by a printer 44 which may be coupled to the operator workstation 40.

Further, the processing component 30 and operator workstation 40 may be coupled to other output devices, which may include standard or special purpose computer monitors and associated processing circuitry. One or more operator workstations 40 may be further linked in the system for outputting system parameters, requesting examinations, viewing images, and so forth. In general, displays, printers, workstations, and similar devices supplied within the system may be local to the data acquisition components, or may be remote from these components, such as elsewhere within an institution or hospital, or in an entirely different location, linked to the image acquisition system via one or more configurable networks, such as the Internet, virtual private networks, and so forth.

It should be further noted that the operator workstation 40 may also be coupled to a picture archiving and communications system (PACS) 46. PACS 46 may in turn be coupled to a remote client 48, radiology department information system (RIS), hospital information system (HIS) or to an internal or external network, so that others at different locations may gain access to the raw or processed image data.

While the preceding discussion has treated the various exemplary components of the imaging system 10 separately, these various components may be provided within a common platform or in interconnected platforms. For example, the processing component 30, memory 38, and operator workstation 40 may be provided collectively as a general or special purpose computer or workstation configured to operate in accordance with the aspects of the present disclosure. In such embodiments, the general or special purpose computer may be provided as a separate component with respect to the data acquisition components of the system 10 or may be provided in a common platform with such components. Likewise, the system controller 24 may be provided as part of such a computer or workstation or as part of a separate system dedicated to image acquisition.

As noted above, the reconstruction of images from data acquired by an imaging system, such as the depicted CT imaging system 10, may be subject to various limitations that may result in artifacts or other imperfections in the generated images. For example, the acquired data may be truncated in the z-direction in certain acquisition scenarios. In particular, in an axial (i.e., circular) cone-beam acquisition, certain of the voxels in the image volume will always be in the X-ray beam during the axial spin (such as those voxels near the mid-plane i.e., plane in which the X-ray focal spot moves) while other voxels are illuminated in certain of the views during the axial spin but not in others. For example, due to the narrow portion of the X-ray cone being closer to the X-ray source 12, (that is, the cone expands or diverges as distance from the source increases) a narrow segment of voxels near the X-ray 12 source may be illuminated while those voxels furthest from the source are fully or mostly illuminated due to being near the wide base of the cone. However, as the X-ray source is rotated axially about the volume, the portions of the volume that are near and far from the X-ray source 12 will also rotate, with the result being that the extent of X-ray illumination a voxel receives may decay monotonically with distance of the voxel from the mid-plane of focal spot rotation. As a result, there is less data available with respect to the edges of the X-ray cone in the z-direction in an axial scan than for those voxels nearer the mid-plane of the cone in the z-direction. This data truncation in the z-direction may prevent the reconstruction of good quality images outside that portion of the volume which is always projected onto the detector during an axial scan.

In the case of mishandled data, any given voxel will be seen by the source and detector for a certain angular view range in a given cone-beam axial scan. However, some Radon directions or frequencies will be measured twice in such a scan. The reconstruction should correctly take into account this redundancy or artifacts may result. Simple sinogram domain weighting may not always meet this goal accurately and therefore more advanced filtering techniques may be useful. In certain instances, mishandled data as described herein may result in cone-beam artifacts in the reconstructed image.

In addition, in some instances where a cone-beam axial scan is employed, certain frequency information may be missing for a given voxel. For example, even inside the 360 degree region generated by a circular (i.e., axial) scan, there may be some missing frequencies, particularly along the z-direction. The amount of missing frequencies will increase with distance from the mid-plane (plane in which the x-ray focal spot moves).

Figure 2:
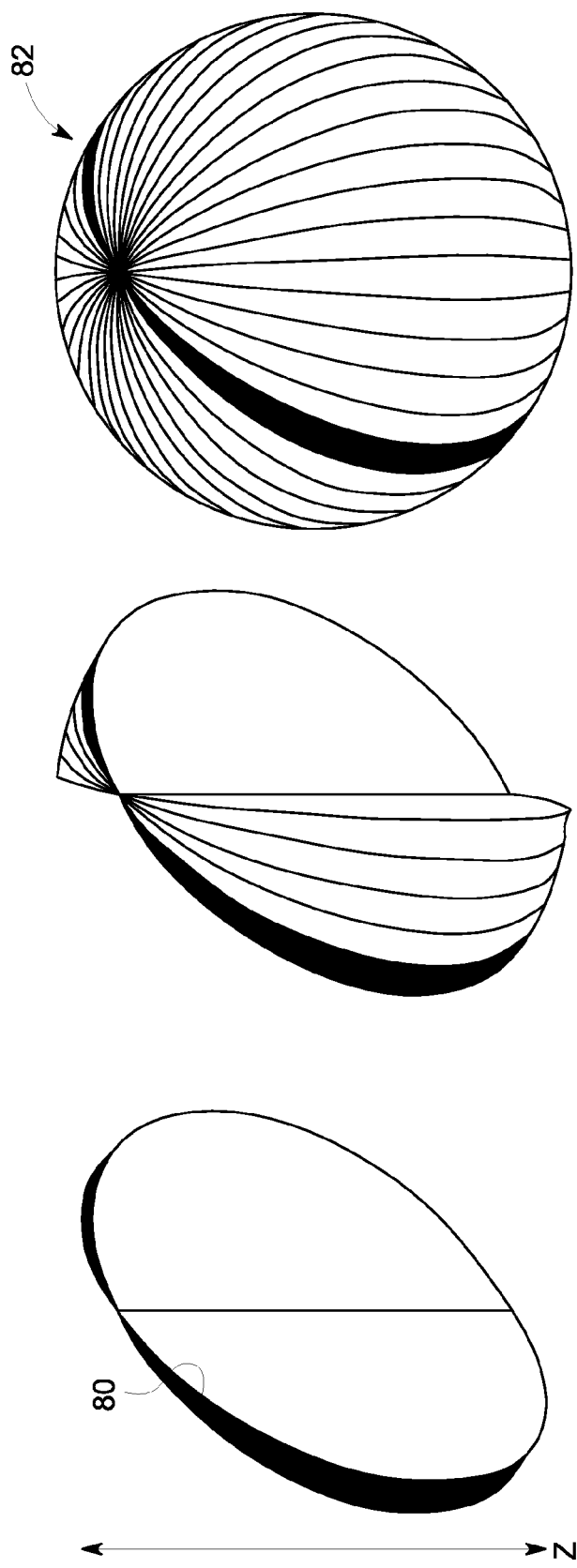
FIG. 2 depicts the sweep of a circle in frequency space to define a spherical shell.

By way of introducing certain aspects of the approaches discussed below, a brief discussion of frequency analysis is provided. For example, turning to FIGS. 2-5, aspects of frequency analysis are discussed that may prove useful to understanding the present approach. In particular, in cone-beam tomography each measured (and filtered) ray contributes 3D Radon (or Fourier) information (hereafter called frequency information) in a great circle (or disk in the Fourier case) that is orthogonal to the ray. In order to get an exact reconstruction at a particular voxel, filtered rays are accumulated whose frequency contributions cover the frequency sphere uniformly. If a ray has cone angle zero, its corresponding great circle in frequency space is parallel to the z (frequency) direction. Such is the case for points that lie in the plane of the source trajectory (the scan plane). Thus, in order to get an exact reconstruction at a particular voxel in the scan plane, filtered rays should be accumulated that pass through the voxel over a 180 degree range relative to or as seen by that voxel. This can be appreciated by noting that the vertical (parallel to z) circle 80 depicted will sweep out an entire spherical shell 82 as it is rotated 180 degrees, as shown in FIG. 2.

Figure 3:
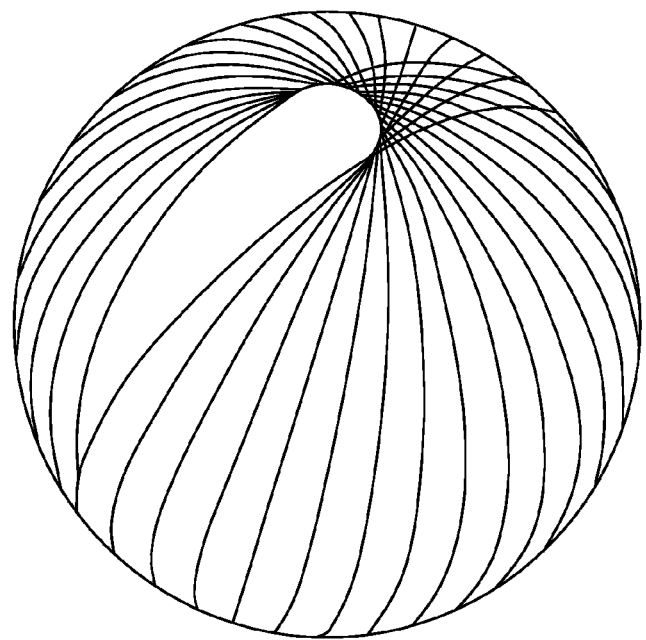
FIG. 3 depicts a region swept out by a circle in frequency space over a 180 degree range for a point outside the scan plane such that frequencies are missing.
Figure 4:
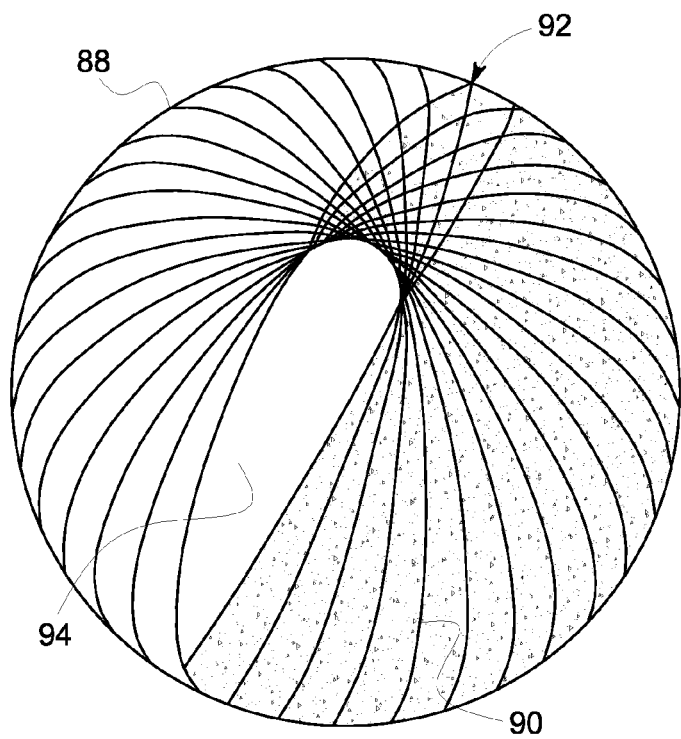
FIG. 4 depicts an alternative view of a region swept out by a circle in frequency space over a 180 degree range for a point outside the scan plane such that frequencies are missing.

For points that lie outside the scan plane, the great circle 80 is tilted off of the z-axis by the cone angle. If such data is used over a 180 degree range, the result appears as depicted in FIGS. 3 and 4. In FIG. 4, the region swept out by the two halves of each great circle is depicted with different hatching (first hatching 88 and second hatching 90) to facilitate visualization. There is a region of the sphere that is covered twice (combined hatching 92) and another region that is not covered at all (missing frequency information 94).

Figure 5:
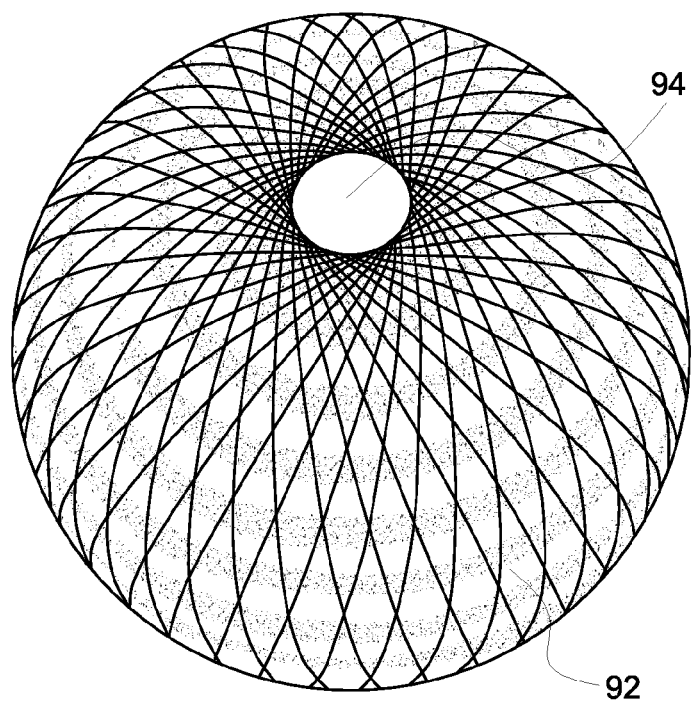
FIG. 5 depicts a region swept out by a circle in frequency space over a 360 degree range.

If this is continued for 360 degrees instead of just 180 degrees, the result appears as depicted in FIG. 5. As depicted in FIG. 5, all frequencies are measured twice (denoted by combined hatching 92) except for those that are not measured at all (missing frequency information 94), as indicated by the gap at the top of the unit sphere. It may be desirable to have the uniform frequency data coverage that a full-scan gives (as depicted in FIG. 5) without suffering from the temporal resolution problems associated with use of a full axial scan (i.e., due to the increased time needed to obtain a full axial scan compared to the length of time needed to obtain an axial half-scan).

Figure 6:
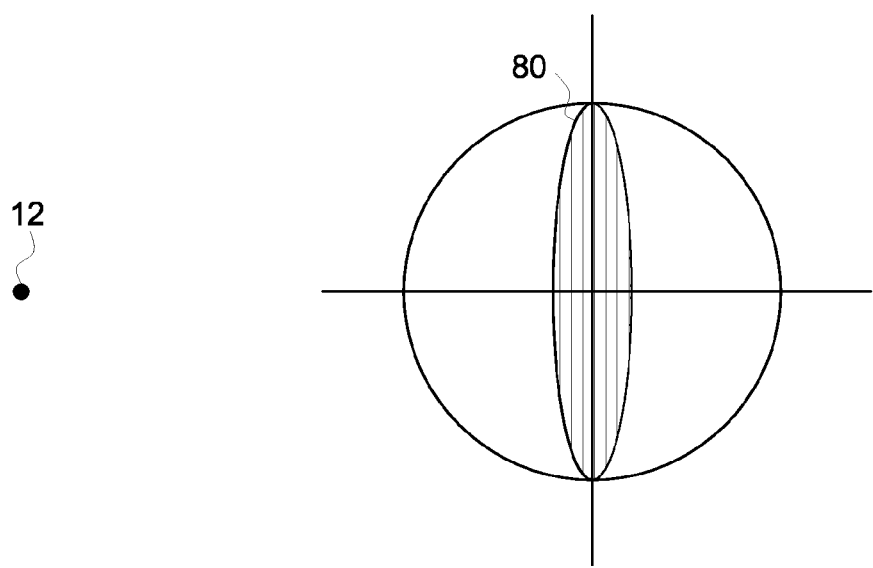
FIG. 6 depicts the contribution of a single view to frequency space.
Figure 7:
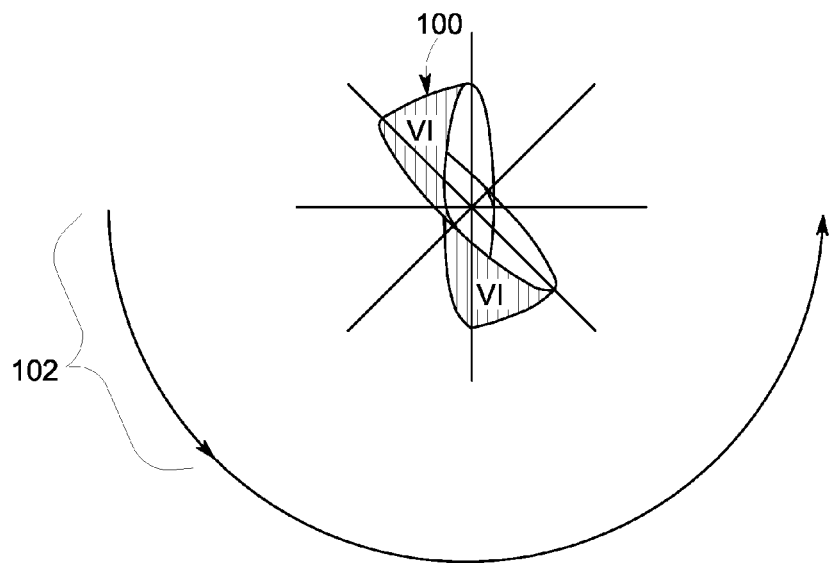
FIG. 7 depicts an entire 45 degree segment of views swept out by the circle of FIG. 6.
Figure 8:
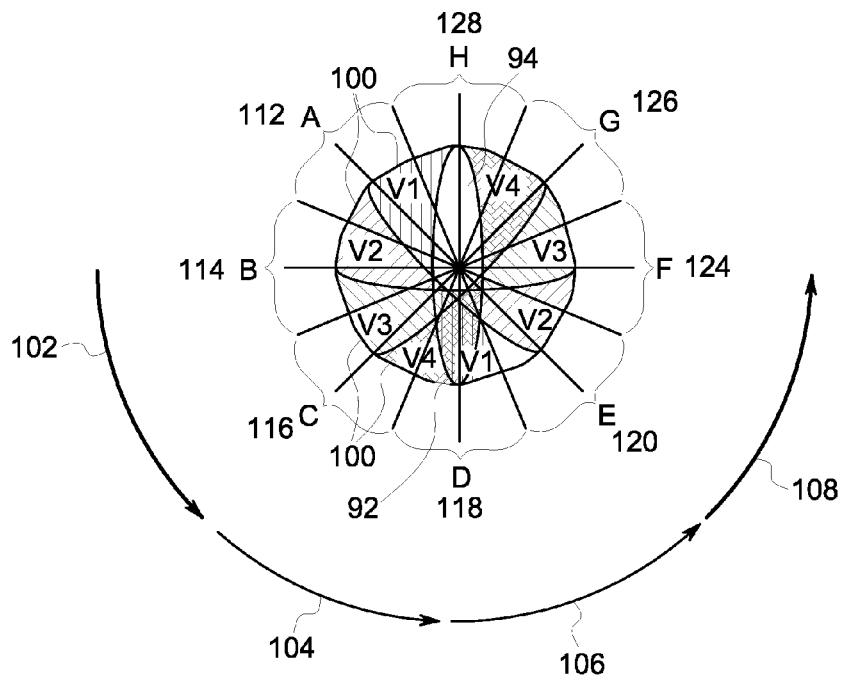
FIG. 8 depicts the combination of four 45 degree segments of FIG. 7 to yield 180 degrees of data.

With the foregoing in mind, FIG. 6 depicts the contribution of a single view to frequency space. This contribution is depicted as circle 80. FIG. 7 depicts an entire 45 degree segment 100 of views (here represented as first segment V1), where segment V1 correspond to a first view range 102. Just as the circle 80 of FIG. 6 represents the Fourier data corresponding to one view, the 45 degree segment 100 of FIG. 7 represents the Fourier data corresponding to 45 degrees. The combination of four of these segments 100 (V1, V2, V3, V4) as depicted in FIG. 8 yields 180 degrees worth of data, with corresponding second, third and fourth view ranges 104, 106, 108 corresponding to respective 45 degree segments 100 V2, V3, and V4.

In the depicted example, the point of interest lies outside the scan plane (e.g., mid-plane) such that the constituent circles are tilted off the z-axis by the cone angle, resulting in an overlap region 92 (i.e., a region that is covered twice) and a region 94 in which frequency information is missing. To facilitate explanation, various sectors 112, 114, 116, 118, 120, 124, 126, 128 are depicted in FIG. 8. Sectors 118 and 128 are disproportionately corrupted, respectively, by overlap region 92 and missing frequency data (region 94), compared to the other sectors. Four other sectors, 112, 116, 120, and 126, are moderately corrupted by the overlap region 92 and missing frequency data (region 94) compared to sectors 118 and 128. The two remaining sectors, 114 and 124, are covered relatively uniformly in terms of frequency, missing only frequency data that would also generally be missing even in an axial full-scan context.

Figure 9:
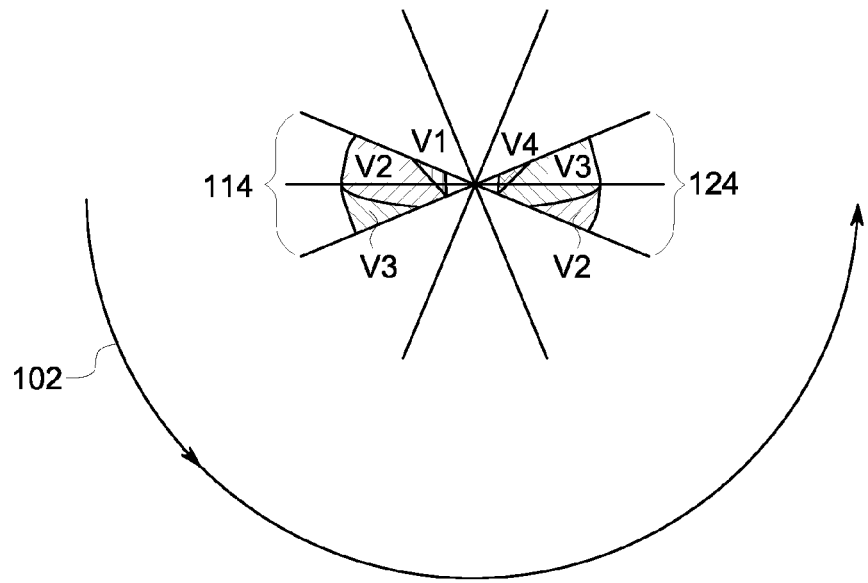
FIG. 9 depicts a sector of data retained in accordance with aspects of the present disclosure.
Figure 10:
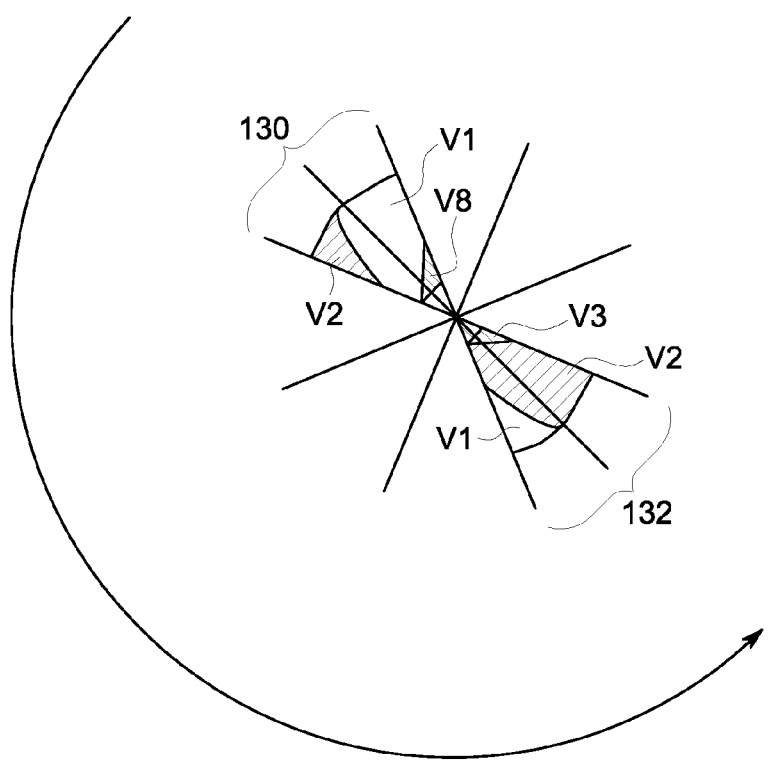
FIG. 10 depicts a further sector of data rotated 45 degrees from the sector retained in FIG. 9, in accordance with aspects of the present disclosure.

In accordance with aspects of the present embodiment, each 45 degree segment 100 is reconstructed, thereby allowing missing data or redundancies in the sectors to be corrected. In one embodiment of the present algorithm, the algorithm retains information from the two relatively complete and uniform sectors (i.e., sectors 114 and 124) and discards the remaining data, as depicted in FIG. 9. As depicted in FIG. 10, the scan range may then be rotated, such as 45 degrees, by removing one portion of image data and adding another from an adjacent segment. For instance, in the depicted example the data associated with V4 has been replaced by V8 to yield new sectors 130 and 132 which correspond to previous sectors 112 and 120.

Figure 11:
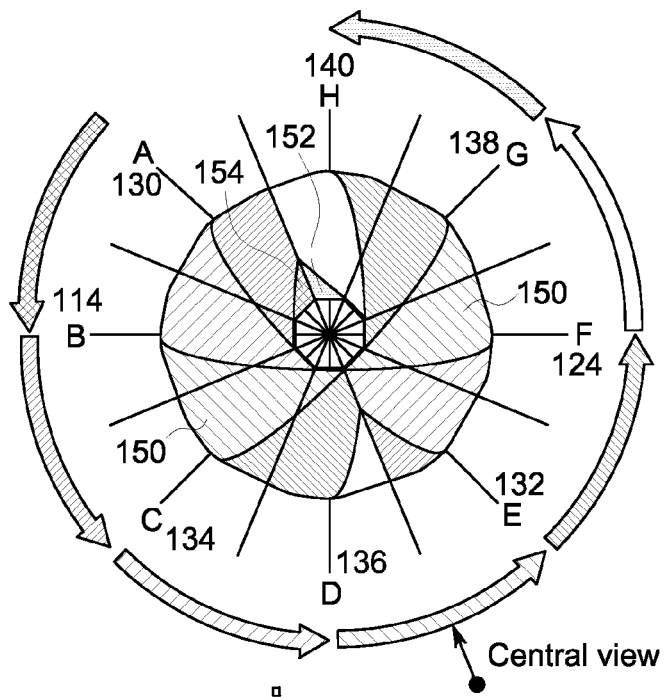
FIG. 11 depicts a combination of generated sectors of data having relatively complete frequency information, in accordance with aspects of the present disclosure.

For instance, in this example, the data associated with V1, V2, V3, and V8 is backprojected and, for this step, sectors other than 130, 132 are filtered out or otherwise discarded. This procedure may then be repeated twice more to obtain contributions to all eight frequency sectors, i.e., to generate another four replacement sectors corresponding to sectors 116, 118, 126, and 128. Combining the initial sectors 114 and 124 (which were relatively complete and uniform) with the generated sectors 130, 132, 134, 136, 138, 140, yields relatively complete frequency information for the point in question, as depicted in FIG. 11. In FIG. 11, each view portion is assigned a different hatching and the frequencies that each portion contributes are indicated by the respective hatching. In this example, the view portion 150 is fully used while view portions 152 and 154 on either end contribute very little. In one embodiment, not only is the frequency coverage generally uniform, but at every frequency that has one contribution, the selected contribution (of the two available) is the one that comes from the view that is closest to a particular view, which we denote as the centerview, which, in cardiac scanning, corresponds to the view acquired at the center of the time interval of relatively quiescent object motion as determined by an EKG signal. Conversely, the mid plane is usually the plane that contains the circular source path. In a cardiac imaging embodiment, the centerview is shifted for parts of the volume in the corner region such that it is the view with the lowest cone angle. In this case, the view is selected that provides rays that are closer to the midplane than their conjugate rays. That is, in the corner, the views closet to midplane may be used, while in the region where data is complete, the view closest to the centerview may be employed.

Figure 12:
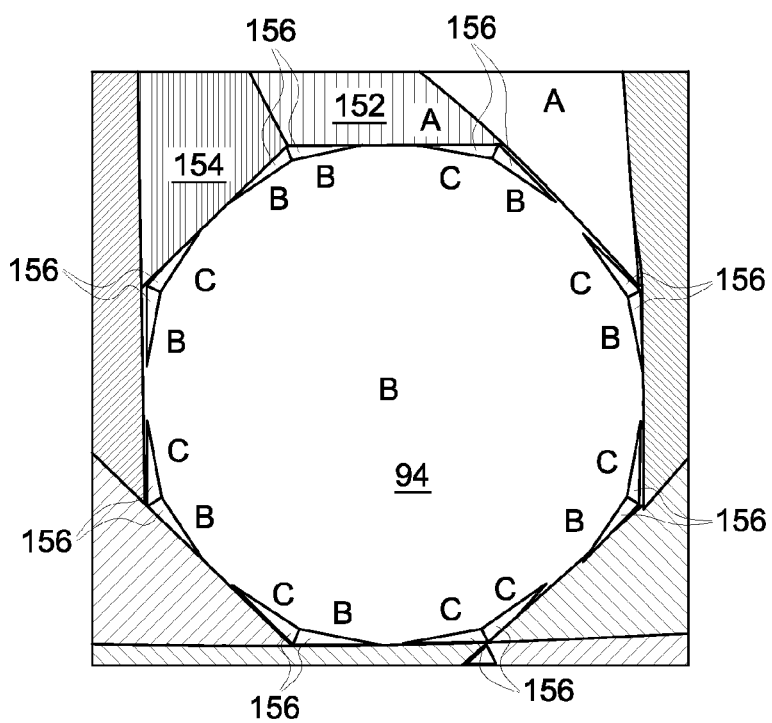
FIG. 12 depicts a close-up of the region of FIG. 11 for which frequency information is missing.

As depicted in FIG. 11, the approach described above results in near uniform coverage of frequency space, with the only non-uniformities occurring proximate to the missing cone, as depicted in FIG. 12, which depicts a zoomed view of the center region of the frequency space representation of FIG. 11. In this example, the letters A, B, and C indicate the number of contributions to each region. This number is always one (denoted by the letter A) except in the missing data cone (where the contributions are zero (denoted by the letter B)) and in sixteen small regions 156 that surround the missing data region 94. These sixteen regions have either zero or two (denoted by the letter C) contributions each. As will be appreciated, the number of view portions (here eight, as depicted in FIG. 11) determine the number and size of the small regions 156. The present algorithm, however, may be applied with more than eight view portions in order to reduce these small regions 156 further if desired.

With the foregoing in mind and by way of summary, in one implementation, eight (or some other number, such as ten, twelve, sixteen, twenty sectors and so forth) sectors of data are backprojected. The data is split after rebinning so that each segment contributes 45 degrees (or some other extent, i.e., for twenty sectors 18 degrees are contributed per segment) of Fourier (i.e., frequency) information regardless of which image voxel one considers. As will be appreciated, the cone angles (and, hence, the amount of tilt between the various great circles and the z-axis) changes with the view angle whenever the voxel under consideration is away from the center of the FOV in (x,y).

Figure 13:
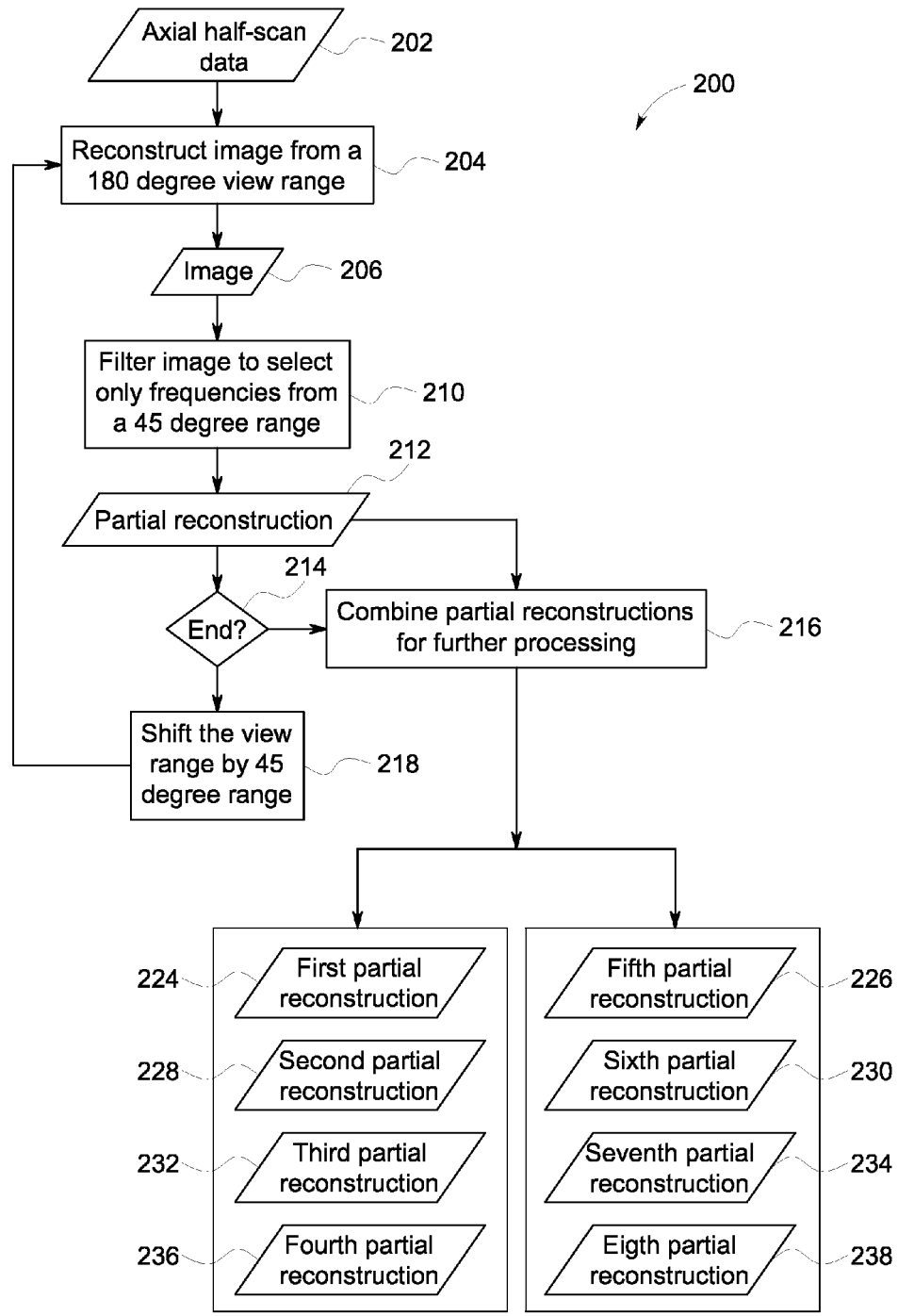
FIG. 13 depicts a flowchart describing one algorithm for implementing an image reconstruction process, in accordance with aspects of the present disclosure.

An example of one such implementation is depicted in the flowchart 200 of FIG. 13. In one such implementation an algorithm may be employed in which an initial set of axial half-scan (or less than full-scan) data 202 is initially reconstructed (block 204) from a 180 degree view range to generate an image 206. The image 206 is filtered (block 210) to select only frequencies from a 45 degree range, thereby generating a partial reconstruction 212. In one embodiment, this process is repeated (at shifted view ranges) a set number of times, such as four times at view ranges that are shifted by 45 degrees each time. In such an embodiment, if the steps have been performed the specified number of times, a determination is made as block 214 and the partial reconstructions generated in this manner can be combined (block 216) to generate a dataset with uniform and complete frequency data. If the specified number of iterations have not occurred, the view range is shifted (block 218), such as 45 degrees, and the next image 206 is reconstructed.

In one implementation, the process 200 may be repeated through another cycle, e.g., another four times in this example. As will be appreciated, in this example if the partial reconstructions that use the same filter are paired, the first partial reconstruction 224 is paired with the fifth partial reconstruction 226, the second partial reconstruction 228 with the sixth partial reconstruction 230, the third partial reconstruction 232 with the seventh partial reconstruction 234, and the fourth partial reconstruction 236 with the eighth partial reconstruction 238. The 180 degree view ranges for each of these pairs of partial reconstructions are complementary (i.e.: diametrically opposed). As a result, the union of the two view ranges is the entire 360 degree view range. Since reconstruction and filtering are linear operations, the same result may be obtained by applying the filter that corresponds to a selected pair of partial reconstructions to a full-scan reconstruction as you would by applying this filter to the two 180 degree reconstructions and then adding the two together. Furthermore, since the four filters sum to one at every frequency, the net result of all eight partial reconstructions is equal to a full-scan reconstruction.

With this in mind, it may be appreciated that: (1) there are two contributions to each frequency from a full-scan reconstruction, or, equivalently, from eight of the partial reconstructions described above, and (2) four partial reconstructions give a result that selects at almost every frequency the contribution from the view that is closer to a given view angle. With this in mind, the fifth through eighth partial reconstructions 226, 230, 234, 238 retain at almost every frequency only the contribution from the view that is farther from the given view angle. Also, selecting the view that is farther from a selected view is equivalent to selecting the view that is closer to a different view, specifically, the view that is 180 degrees away from the selected view.

Figure 14:
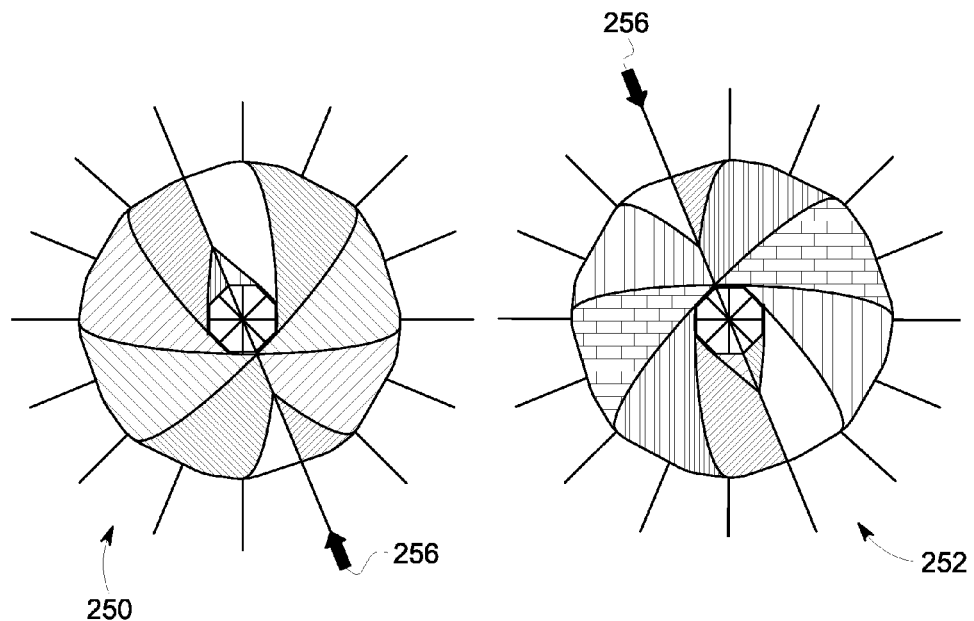
FIG. 14 depicts two intermediate volumes generated in one implementation of an algorithm in accordance with aspects of the present disclosure.

With the foregoing in mind, one implementation of the present algorithm produces two separate intermediate volumes 250, 252, the respective reconstructions of which are depicted in frequency space in FIG. 14. The first intermediate volume 250 is the result of the first four partial reconstructions 224, 228, 232, 236 and the second intermediate volume 252 is the result of the last four partial reconstructions 226, 230, 234, 238. As will be appreciated by the hatching, the view ranges that contribute the most to one reconstruction contribute very little, if any, to the other. Indeed, no point (frequency) is filled by the same view range in the two complementary reconstructions 250, 252. The two reconstructions 250, 252 are predominantly built from data in two opposing 180-degree view ranges of the full-scan. The depicted arrows 256 indicate the center of the view interval used for each particular reconstruction 250, 252.

Figure 15:
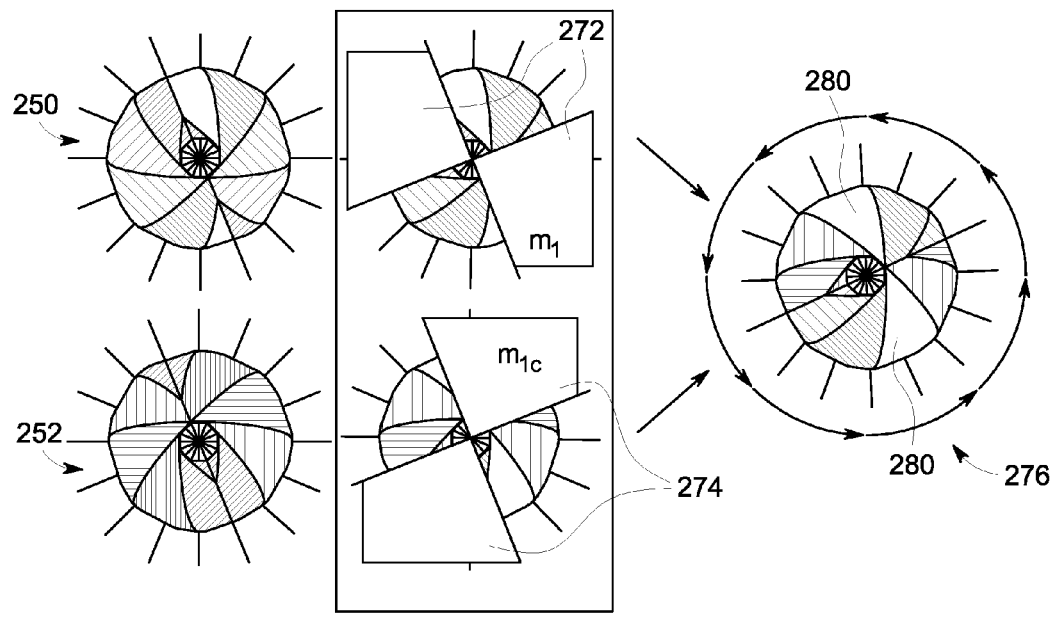
FIG. 15 depicts the combination of two intermediate volumes with filtering in frequency space to generate a composite reconstruction, in accordance with aspects of the present disclosure.

Of particular, interest, the two intermediate reconstructions 250, 252 can be mixed together via filtering (such as via filter 272 and complementary filter 274) in the frequency space, as depicted in FIG. 15, to produce a composite reconstruction 276 that is predominantly built from an arbitrary (e.g., user selected) 180-degree view range. In one such example, 90-degree sectors of each intermediate reconstruction 250, 252 may be combined to produce a composite reconstruction 276 that predominantly uses data from a 180-degree range with a center-view exactly in the middle of the center-views corresponding to the intermediate reconstructions 250, 252. Of note is that the central segment 280 in the composite reconstruction 276 corresponds to frequencies of the view portion that are 90 degrees offset from the respective view portions corresponding to the frequencies that correspond to the central views 282, 284 of the intermediate reconstructions 250, 252.

Figure 16:
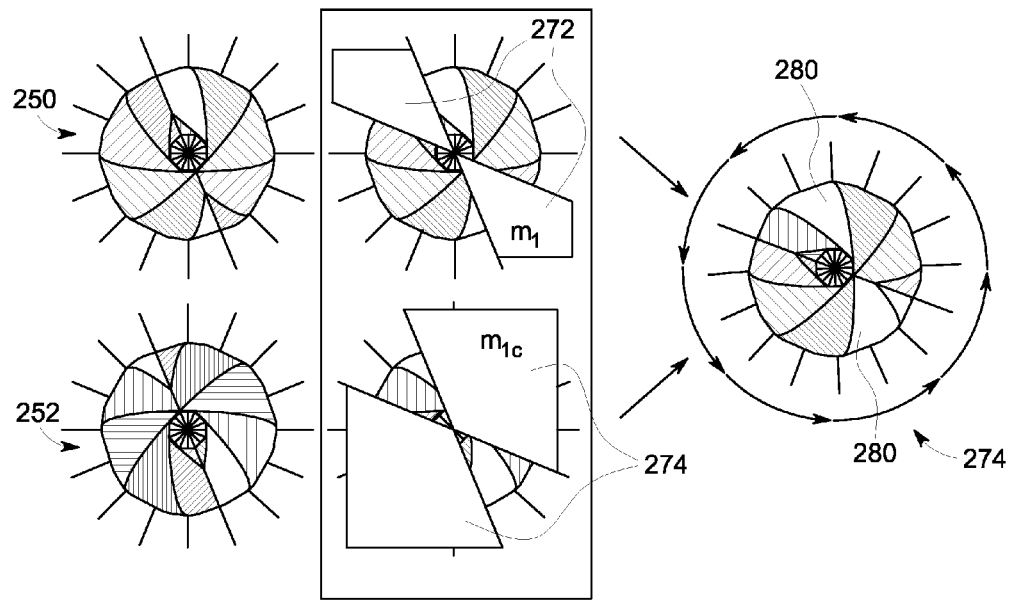
FIG. 16 depicts an alternative combination of two intermediate volumes with filtering in frequency space to generate a composite reconstruction, in accordance with aspects of the present disclosure.
Figure 17:
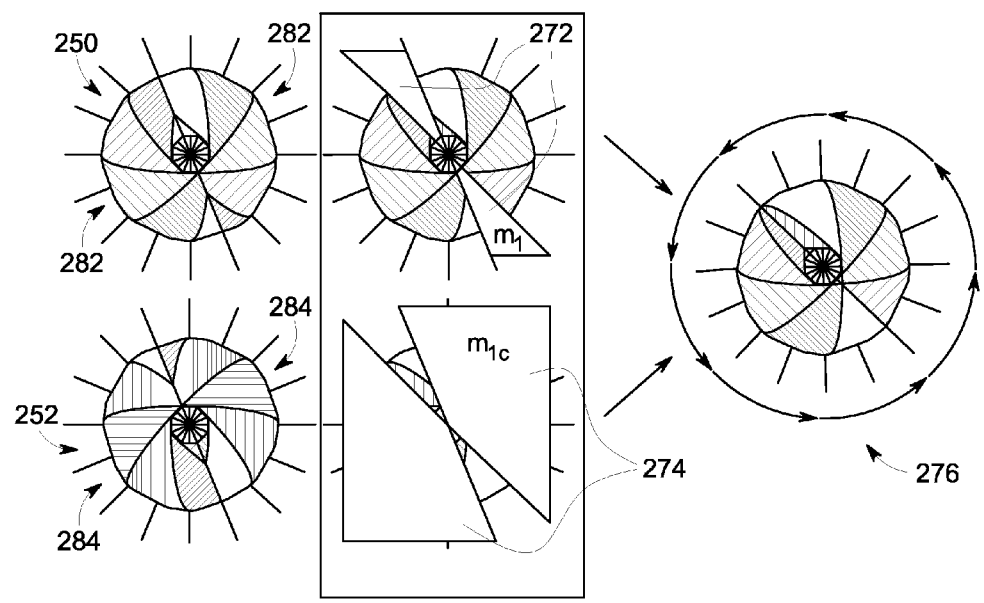
FIG. 17 depicts another combination of two intermediate volumes with filtering in frequency space to generate a composite reconstruction, in accordance with aspects of the present disclosure.

In other examples, depicted in FIGS. 16 and 17, the centerview of the composite reconstruction 276 may be shifted to other extents. For example, in the implementation depicted in FIG. 16 the centerview of the composite reconstruction 276 is shifted 45 degrees relative to the first of the two intermediate reconstructions 250, 252. As will be appreciated, the offset need not be an increment of 45 degrees. For example, FIG. 17 depicts an implementation in which the centerview of the composite reconstruction 276 is shifted by 22.5 degrees relative to the first intermediate reconstruction 250. The look of the frequency space differs from the previous example, but the result is the same: the frequency contribution that is closest to the chosen centerview is selected.

As will be appreciated from the above examples and discussion, one can efficiently generate a variety of reconstructions each with a different cardiac phase from a single pair of intermediate reconstructions 250, 252. Thus, a time series of the cardiac motion can be generated efficiently as a post-processing step. Even if more than a single rotation of data is acquired, one intermediate reconstruction can be generated for each 180-degree view range and an image representing any cardiac phase (that is sufficiently within the acquisition window) can be generated.

Figure 18:
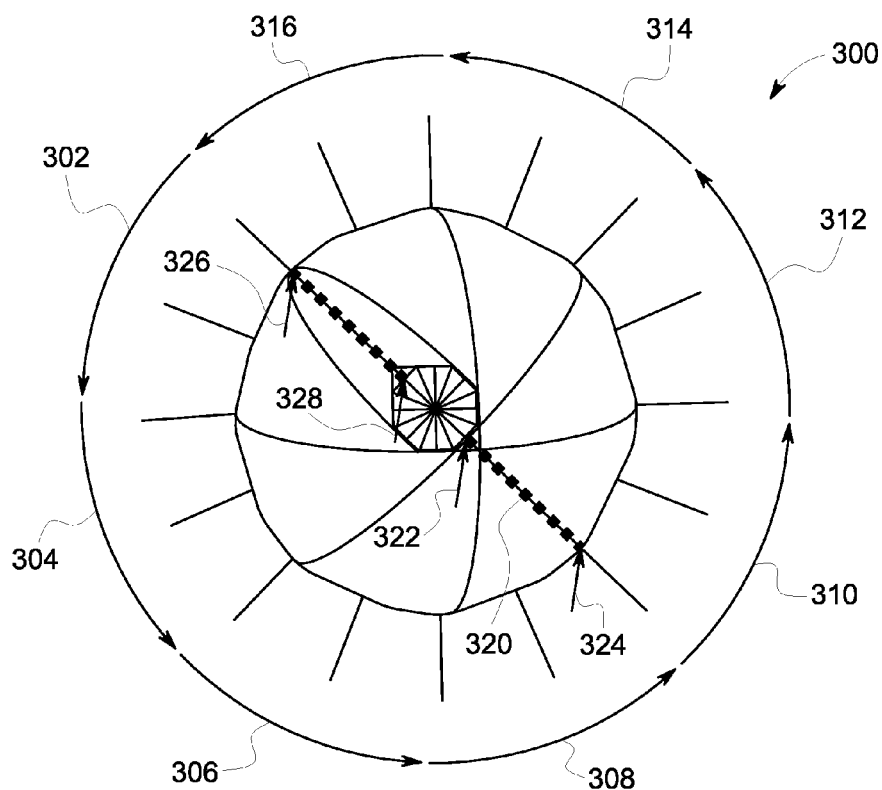
FIG. 18 depicts a reconstruction in conjunction with respective view ranges showing a sequence of data acquisition and, via dashed segments, the portion of Fourier space at which there are discontinuities in terms of the time or view at which data is acquired.

While the preceding discussion relates to frequency analysis in accordance with embodiments of the present algorithm, the temporal characteristics of such an algorithm are now discussed. For example, turning to FIG. 18, a reconstruction in accordance with the present algorithm is depicted in conjunction with a sequence of view ranges 302, 304, 306, 308, 310, 312, 314, 316 associated with the acquisition of the image data. As will be appreciated, the time at which a frequency is acquired is continuous as a function of frequency except along the dashed line 320. The magnitude of the discontinuity changes as you move along the dashed line 320. At the first arrow 322, the magnitude of the discontinuity is zero. This magnitude increases as you move along the dashed line 320 downward and toward the right until you reach the second arrow 324, at which point the discontinuity is equal to the time it takes the source to rotate 180 degrees. The discontinuity has the same magnitude at the second arrow 324 and third arrow 326, but grows even larger as you move away from the third arrow 326 along the dashed line 320. The discontinuity magnitude reaches its maximum at the fourth arrow 328, at which point it is equal to the time it takes the source to rotate 360 degrees. That is, there are frequencies (although they form a very small set) near the tip of the fourth arrow 328 that are acquired only at the very beginning of the scan, and others frequencies nearby that are acquired only at the very end of the scan.

The discontinuities along the dashed line 320 can lead to streaking artifacts if the object being imaged is undergoing motion during the data acquisition process. In order to address this issue, multiple, different reconstructions may be performed in accordance with the present algorithm, each with slightly offset phases (e.g., cardiac phases) and the multiple reconstructions may be averages together. As a result of the linearity of Fourier transforms and the observations made above that each phase can be generated through Fourier mixing of the intermediate reconstructions 250, 252, a reconstruction with a smooth transition region can be generated as easily as one with a sharp transition by using an appropriately smoothed Fourier mask.

The preceding discussion relates to implementations in which 360 degrees of data is available. However, it should be appreciated that even if 360 degrees of cone-beam data is acquired, some portions of the reconstruction volume may not be measured (project onto the detector) for the full set of views. That is, some portion of the reconstruction volume is measured at all views, while the remainder of the reconstruction volume is not measured at all views.

With respect to the portion of the reconstruction volume that is not measured at all views, in these regions, extrapolated data is used to fill in some regions of frequency space. The result is that the intermediate reconstructions 250, 252 may include artifacts. Since different parts of the volume project onto the detector for different view ranges, the frequency content of the artifacts is spatially variant. Indeed, there will be a certain sector (opposite the centerview) of each axial image in the corner region that is least affected by the truncation artifacts in each of the two intermediate reconstructions. By applying the Fourier mixing discussed above, this polar angle can be changed to any direction.

This observation may be employed as part of the present algorithm to mitigate truncation artifacts. For example, in one such embodiment, the portion of the reconstruction volume that is not measured at all views is segmented into multiple sectors. For each sector, Fourier mixing as discussed above may be applied to produce an image that consists mostly of the half-scan that is centered at the view opposite the selected sector. The result will be an image that has minimal artifacts in the sector of interest. The minimal artifact sector of each resulting image can then be combined.

Figure 19:
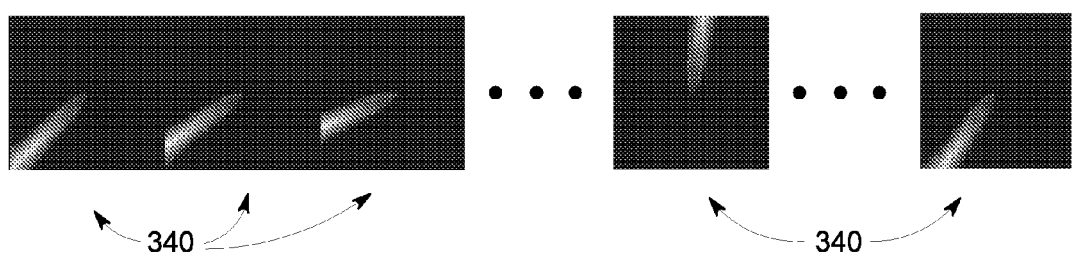
FIG. 19 depicts examples of sector masks in accordance with aspects of the present disclosure.

In practice, it may be useful for the sectors to be overlapping and weighting masks may be defined to blend the overlapping sectors together. Since the amount of available data is smallest at image locations that are furthest from the region that is measured at all views, sector masks may be employed that overlap not at all or very little on the edges, but overlap substantially near the center. This allows full use of the available data while also mitigating the effects of z-truncation on the images. In one such implementation, 36 sectors may be employed with corresponding sector masks 340. Five samples of such sector masks 340 (corresponding to sectors 1, 2, 3, 15, and 36 in a 36 sector implementation) are depicted in FIG. 19 to illustrate the general lack of overlap near the edges but the overlap near the center. In one embodiment, an even number of sectors may be employed, allowing the computational time to be reduced by a factor of two by combining image mask opposing pairs by subtracting one mask in each pair from the other.

The Fourier mask that is used in the Fourier mixing step may also employ some degree of smoothing. In implementations where both forms of smoothing are employed, the combination of the two smoothing operations may effectively provide a suitable view weighting function for each voxel in the image.

Even in the case of a sharp Fourier mixing mask, the data contributions are not completely limited to a half-scan. Indeed, there are some small contributions from every view, including those that are extrapolated. One approach that may be employed in conjunction with the present algorithm would be not to extrapolate data. In instances where no extrapolation is performed, clearly, there would be no contributions from extrapolated data, but there may be a slightly larger region of missing data, with the missing frequencies being low frequencies in the in-plane direction. Thus, depending on the willingness to experience this trade-off, data extrapolation may or may not be performed in conjunction with the present algorithm. In practice, when 225 degrees worth of parallel data are available (e.g., five of eight 45 degree segments) the artifacts attributable to data extrapolation may be acceptable and extrapolation may be performed with the present algorithm. Conversely, when the non-extrapolated data becomes less than 190 degrees the artifacts may be severe enough to warrant not performing data extrapolation (at least for some views).

In the preceding, the formation of the two intermediate reconstructions 250, 252 has been attributed to performing two sets of four separate 180 degree reconstructions (or some other number and extent of reconstructions) followed by applying Fourier masking to each of the eight reconstructions before combining each set of four into a single image. While such an implementation is useful as a means for explaining the present algorithm and for deriving the algorithm, in other embodiments, the present reconstruction algorithm may be implemented differently to achieve a more efficient outcome.

Figure 20:
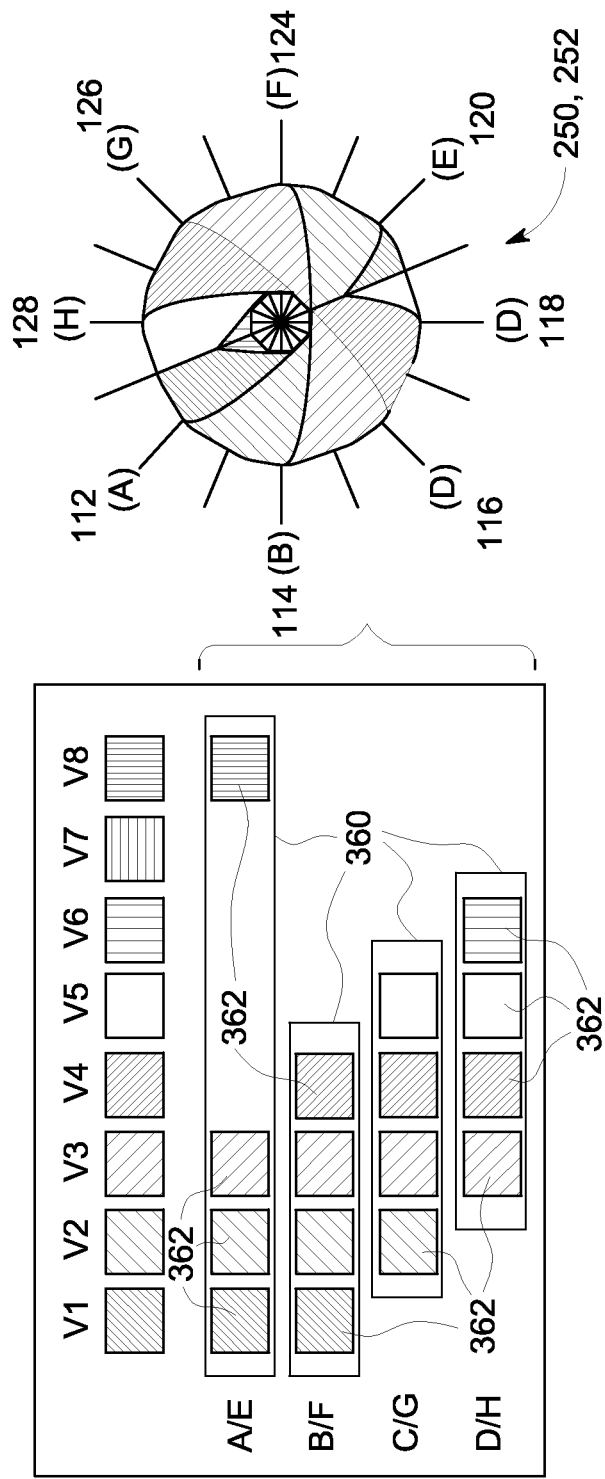
FIG. 20 depicts an alternative conceptualization of the present algorithm in accordance with aspects of the present disclosure.

For example, turning to FIG. 20, an alternative way of conceptualizing, and implementing, the present reconstruction algorithm is described. In this example, each dashed box 360 delineates the reconstruction segments that are filtered with a different filter. For example, the A/E filter would be applied to the reconstruction that is obtained by backprojecting view portions V8, V1, V2, and V3. View portions V1 through V4 may then be backprojected and the B/F filter applied to the resulting reconstruction and so on. The total number of view portion backprojections 362 is sixteen and there are another sixteen required to form the other intermediate reconstruction. This can be simplified by backprojecting each view portion only once. Since backprojection is linear, we can combine the eight resulting volumes in the image domain prior to filtering to obtain the same result. This reduces the backprojection load by four.

Figure 21:
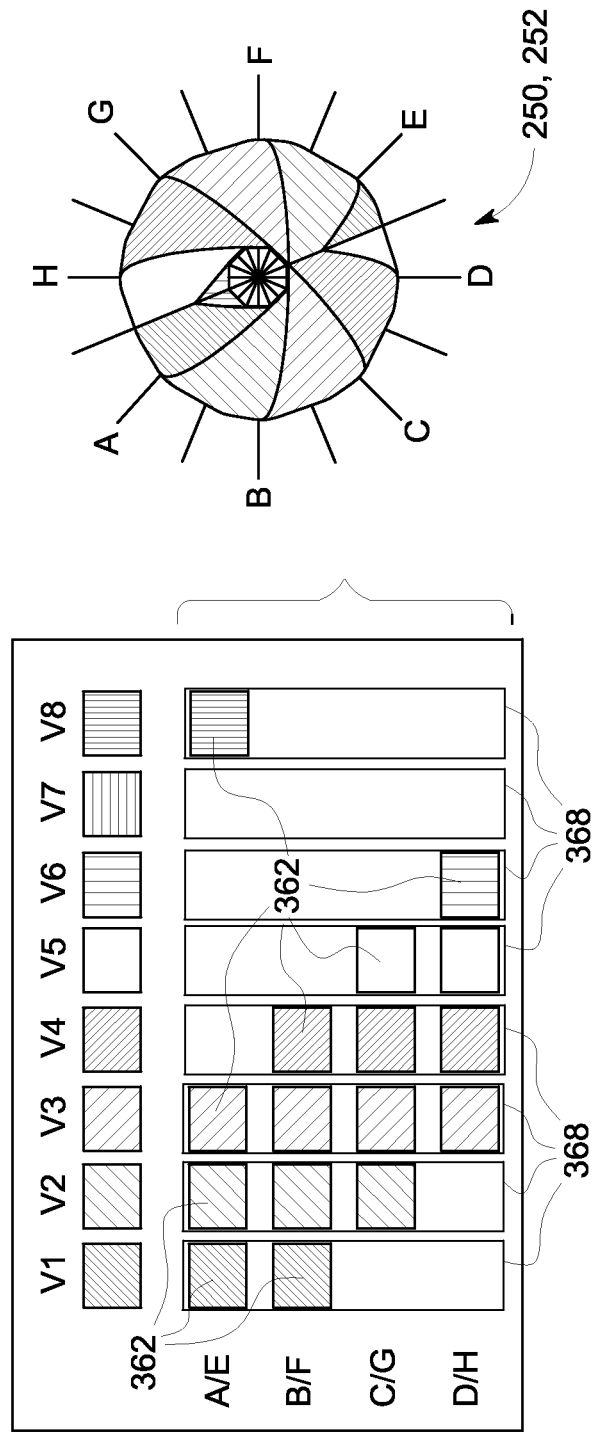
FIG. 21 depicts another conceptualization of the present algorithm in accordance with aspects of the present disclosure.

An alternative optimization is also based on linearity, but in this case it is the linearity of the filtering. The combinations of FIG. 20 may be reordered (denoted by dashed boxes 368), as depicted in FIG. 21, to avoid the need to combine the view portion reconstructions. Instead, each view portion reconstruction is filtered with a single filter. For example, the V1 volume may be filtered with a filter that is the sum of the A/E filter and the B/F filter. If the complementary filter is applied to each view portion reconstruction, the other intermediate reconstruction is produced. Furthermore, the filter applied to one view portion is always complementary to the filter applied to the opposing view portion (the one 180 degrees away). As will be appreciated, the complementary filter is the filter that, when summed with the original filter, adds to a value of 1 for all frequencies. So where the filter is 1, the complementary would be 0 and so forth. This suggests an additional optimization: view portions can be subtracted in opposing pairs to reduce filtering. Also, instead of storing intermediate reconstructions 250, 252 that are representative of two different halves of the full-scan, we can store one that represents the full-scan and one that represents the difference of the two halves of the full-scan, i.e., the differential.

Figure 22:
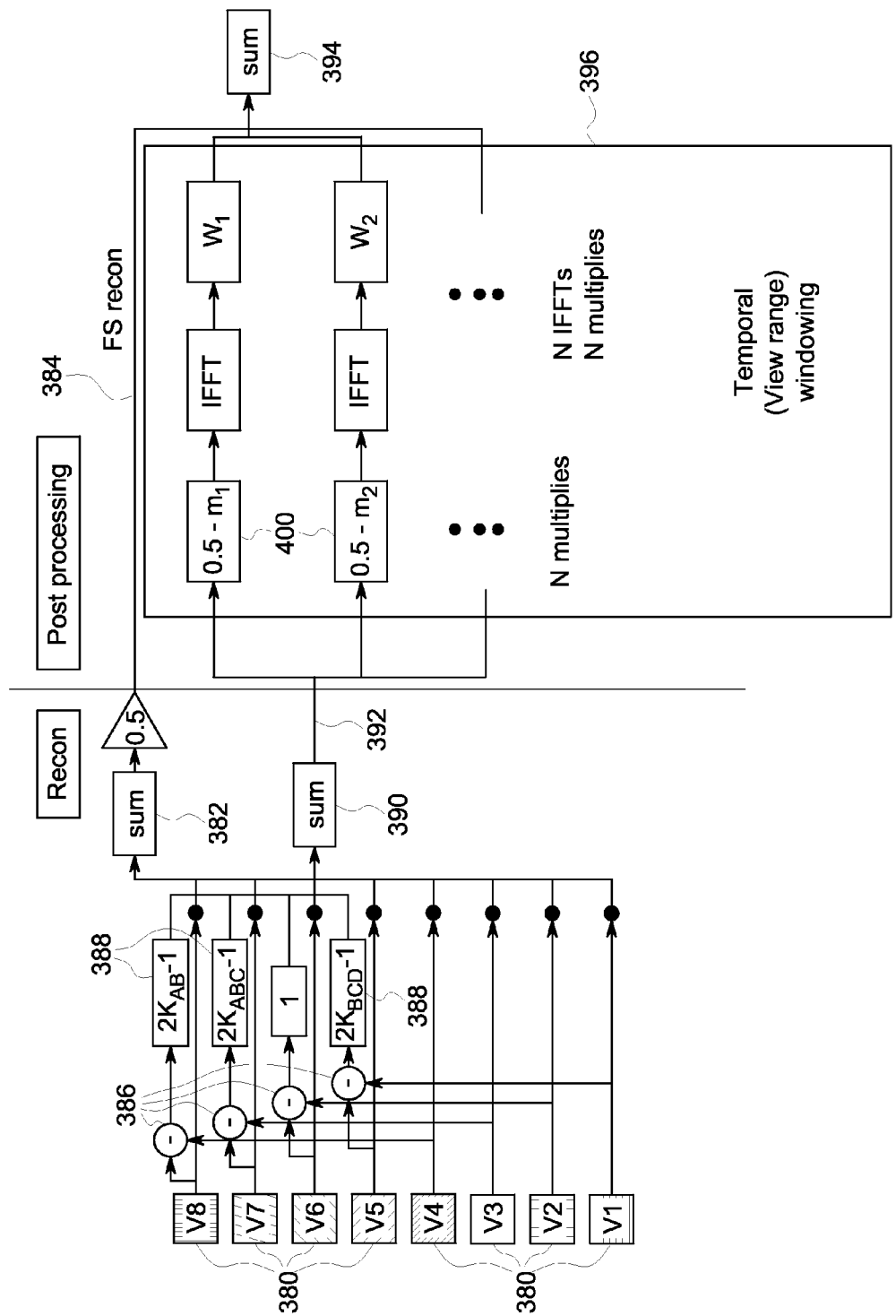
FIG. 22 depicts a flow diagram of an algorithm for processing image data in accordance with aspects of the present disclosure.

With these examples in mind, one suitable implementation of the present algorithm is depicted in FIG. 22. In this example, eight initial volumes 380 are reconstructed, each based on backprojecting one 45 degree view portion. The sum (block 382) of all eight initial volumes is stored as one intermediate reconstruction 384 (i.e., a full-scan reconstruction). Each view portion is subtracted (blocks 386) from its conjugate before filtering. The filtering is done by a multiplication (blocks 388) after a 2D fast Fourier transform (FFT) of each slice. One of the pairs does not require filtering, but the FFT may still be still performed. These four 2D Fourier domain volumes are added (block 390) and stored as the second intermediate volume 392. This is the end of the reconstruction portion.

The filtering of the eight view portion reconstructions 380 is based on binary masks 388 denoted $K_{AB}$, $K_{ABC}$, and $K_{BCD}$.

These masks 388 are based on the frequency sectors that are preserved. For example, $K_{AB}$ is a mask that is 1 in the A and B sectors (including the conjugate sectors E and F) and is 0 in all other sectors (C, D, G, and H). In one implementation, the filters that are applied are actually (2*K−1), such that the region that is 0 is replaced by −1. This is a result of switching from the intermediate reconstructions 250, 252 being two halves of the full-scan to the intermediate reconstructions 250, 252 being the full-scan and the difference between the two halves.

In post-processing, the full-scan reconstruction is added (block 394) to a temporal windowing volume 396 produced by filtering the second volume 392. Since the centerview is shifted in the portion of the reconstruction volume that is not measured at all views, this temporal windowing volume 396 may be built by mixing in the image domain N filtered versions of the second volume 392 using the respective sector masks discussed above with respect to FIG. 19.

In the temporal windowing function of the presently discussed embodiment, there is another Fourier mask that is applied (block 400). This mask is denoted $m_k$ and is defined in polar spatial frequency coordinates (with polar angle in the range [0,pi] and radius being a signed distance). For example, $m_k(t,R)$ is the value of the $k^{th}$ temporal windowing mask at polar angle t and radius R. In some cases, the mask is invariant in the second variable (R), but flexibility is available to allow a mechanism for trading off noise and resolution in the corner region. The function m may be generally defined as follows:

$$m_k = f(t - t_k, R) \quad (1)$$

with f a positive function and:

$$f(t,R) + f(t+\pi, R) = 1 \quad (2)$$

$$f(t,R) = f(t+2\pi, R) \quad (3)$$

$$f(0,R) \geq f(t,R) \quad (4)$$

and where f never increases as t goes from 0 to π. For example, f(t, R) could be a trapezoidal function:

$$f(t,R) = f(t) = \text{Trapezoid}(\pi, s). \quad (5)$$

In one implementation, the function used is $(0.5 - m_k)$ due again to the intermediate reconstructions being implemented as the full-scan reconstruction and the conjugate discrepancy. In one implementation of the steps of the flowchart of FIG. 22, the number of temporal windowing computations can be reduced to one if only the portion of the reconstruction volume that is measured at all views is reconstructed. Also, if temporal resolution is not an issue (for example, in a non-cardiac scan) the temporal windowing can be skipped for the portion of the reconstruction volume that is measured at all views. However, even in this case the temporal windowing still may be applied to the portions of the reconstruction volume that are not measured at all views in order to select an appropriate view range for truncation artifact mitigation.

There is an additional simplification that can be made to the present algorithm. In the preceding examples, the filtering (after backprojection) which has been discussed has been done in two steps. The first of these steps is done to convert our eight initial view portion reconstruction volumes into two volumes (i.e., intermediate reconstructions 250, 252). The second filtering step is done to combine the two reconstructions into a single volume. Each of these filters can be decomposed into the product of two simpler functions. One of these functions is the same in both functions and is its own inverse since all of its values are either 1 or −1. Consequently, each of the two filtering functions can be divided by this common self-inverting function.

Figure 23:
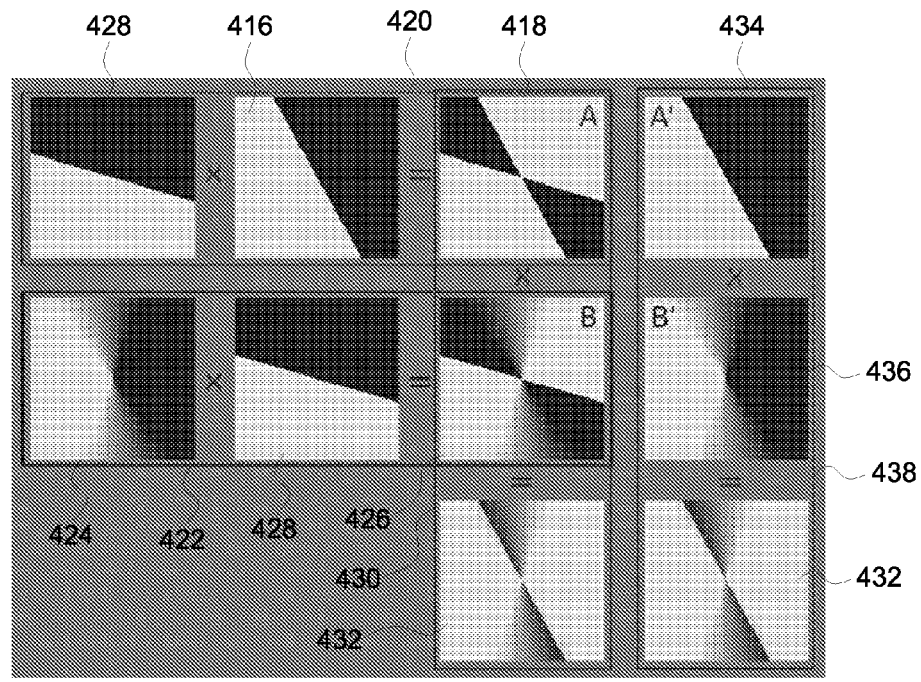
FIG. 23 depicts a combination and simplification of filtering functions, in accordance with aspects of the present disclosure.

Graphically this is shown in FIG. 23, where, in the first rectangle 420, the filtering function A 418 (from the first filtering step 388) is the product of two signum functions 428 (where a signum function is a function that is 1 when the dot product with a particular vector is positive and −1 when the dot product with the vector is negative). The filtering function B 426 is the product of a signum function 428 and a more smooth function 424 that is similar to a signum (graphically depicted in the second rectangle 422). The third rectangle 430 shows the product 432 of the two filtering functions 418, 426. Since $S_1$ and $S_2$ are the same signum function 428, we can remove it from both filtering function A and B. This gives A' 434 and B' 436, which are simpler functions than A 418 and B 426. When we multiply these new functions (A' 434 and B' 436) (as depicted in fourth rectangle 438) we get the same result 432 as when we multiply A 418 and B 426.

This example only covers the case of one of the eight view portions for one of the image sectors. However, all of the view portions are filtered with a filter that can be decomposed into the product of two signum functions. Also, the signum function of interest is the same in each case (it is the other signum function that changes with view portion number). In addition, the filter for all the sectors can also be decomposed as above. Furthermore, the signum function is always the same (it is the other function that changes with sector). As a result, the above result holds for all view portions in all image sectors.

The above can be conceptualized and/or implemented in an alternative manner as well. For example, as noted above, the two volumes in the above formulation represent the frequencies contributed by 1) both contributions to the full-scan and 2) the difference between the two contributions to the full-scan. This observation remains true after the above modifications. However, what changes is the selection criteria for determining which of the two contributions is subtracted from the other to produce the second volume. In the previous examples, the contribution that came from the source angle that was closer to a particular "central" source angle was subtracted from the contribution from the other source (the one farther from the "central" source angle). In the present case, we subtract the contribution that comes from the right (or left) side of the ramp filter in frequency space from the contribution that comes from the left (or right) side.

Figure 24:
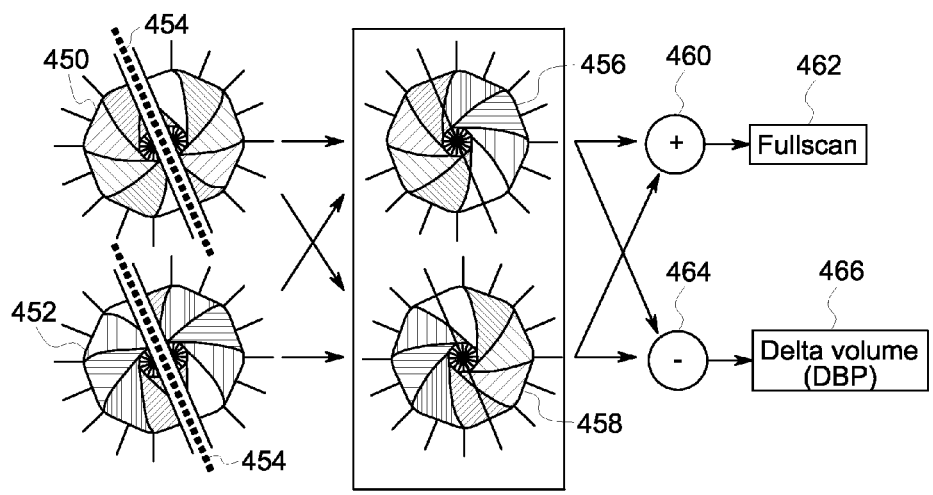
FIG. 24 depicts the combination of intermediate reconstructions to generate a fullscan reconstruction and a difference volume, in accordance with aspects of the present disclosure.

An example of this is depicted in FIG. 24, in which on the left are the two contributions 450, 452 split based on proximity to a center view angle 454. Swapping one half of the first contribution 450 with one half of the second contribution 452 results in the reconstructions 456, 458. This example shows the contributions split based on the side of the ramp filter (left or right). The sum 460 of these two contributions 456, 458 is the full-scan 462. The difference 464 of the two contributions 456, 458 is the delta volume 466, which is closely related to the derivative backprojection (DBP) volume where the backprojection is done over the entire full-scan. Where the two contributions 456, 458 are the same (i.e., there is no motion or z-truncation), then the delta volume will be zero, except to the extent noise may be present.

One desirable aspect of the preceding implementations is that the filters are simple and there is no risk of a mismatch between the two signum functions, which cancel each other out. Also, there is no concern with making the symmetry angle match up with any particular orientation (like a view portion boundary or a line at an increment of 45 degrees from the y axis) since the symmetry angle no longer exists. The view portion boundaries can be chosen freely without regard to the cardiac phase.

The present approaches may also be employed in multi-sector reconstructions. For example, if more than a full-scan is acquired, the present algorithmic approaches can be used to reconstruct additional intermediate volumes. In such instances, one intermediate reconstruction may be generated for every 180 degrees of data. For example, in one embodiment, the data is padded by exactly 90 degrees at the beginning and the end of the scan. Each padded view at the beginning (end) is copied from an actual view that was acquired one rotation after (or before) the padded view. Additional views are then padded at the end following this same procedure until the total view range is a multiple of 180 degrees. For example, if 3.25 rotations of data have been acquired, 90 degrees up front and 180 degrees at the back end would be copied. The total view range would then be 4 rotations. The number of intermediate recons in this case would be seven. This is the original view range in rotations times two (since there are two 180 degree segments per rotation) and then rounded up (ceil (3.25*2)=7).

Figure 25:
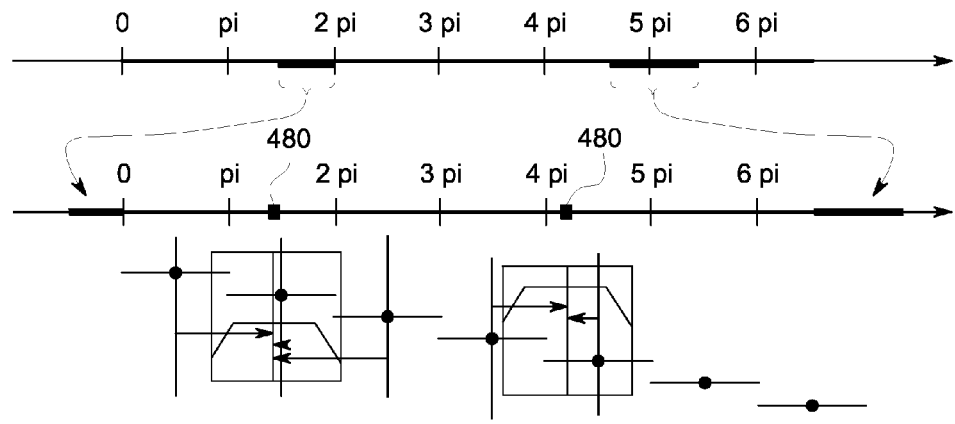
FIG. 25 depicts a multi-axial reconstruction in accordance with aspects of the present disclosure.
Figure 26:
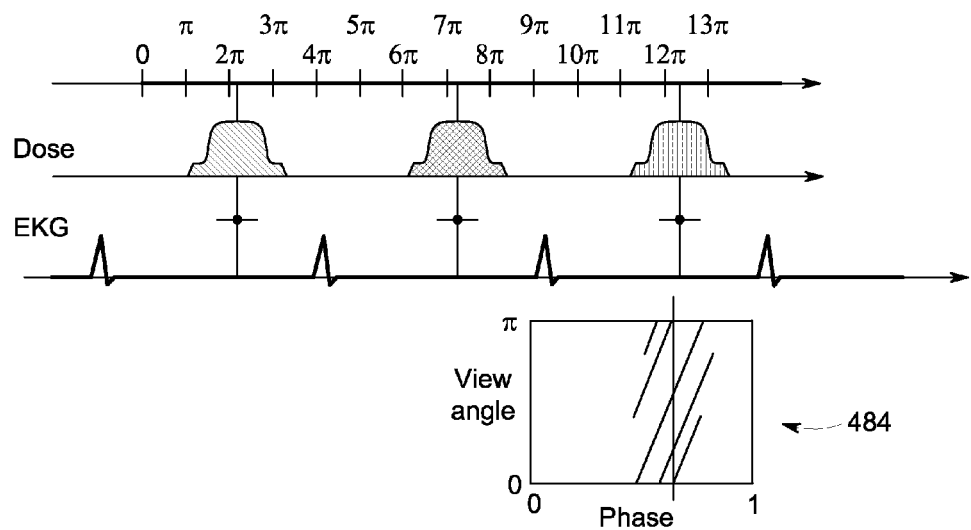
FIG. 26 depicts a multi-sector reconstruction in accordance with aspects of the present disclosure.

After this padding step, a reference angle would be selected and mask functions (m) would be built for the 2 to 3 intermediate recons that are nearest to the reference angle. For instance, in the example depicted in FIG. 25, two possible reference angles 480 are indicated. In one case, the trapezoidal function that defines m extends to three nearby recons, in the other case only two are reached For multi-sector reconstruction, two possible implementations may be employed. In one, depicted in FIG. 26, the process may begin as with the multi-axial approach discussed above. However, the half-scan may all be mapped into a heart phase/view angle space 484. Subsequently, for each view angle the various reconstructions may be weighted based on how close they are to the correct phase.

Figure 27:
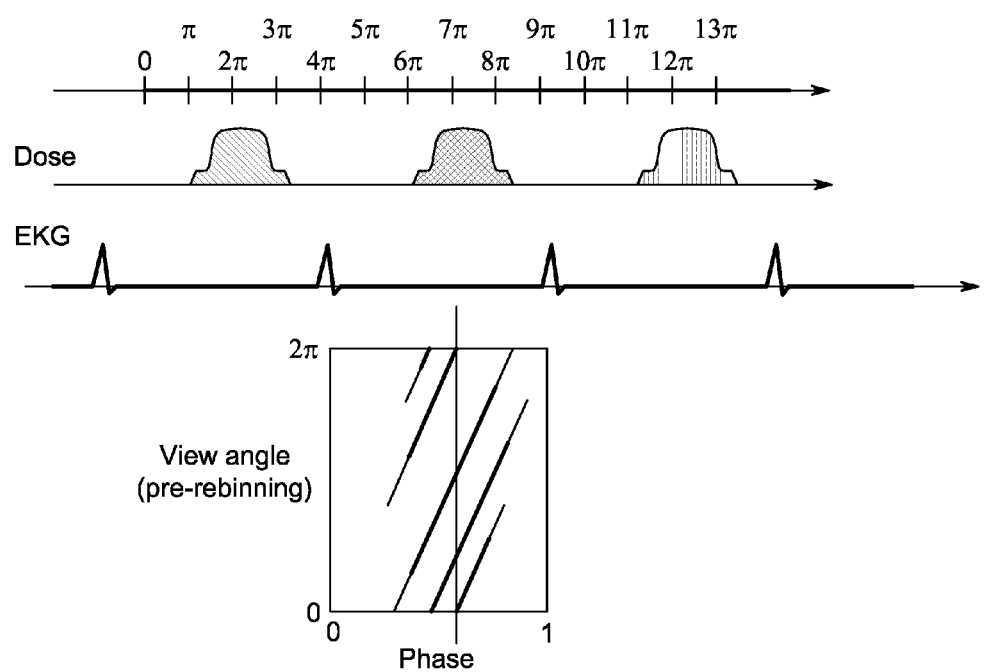
FIG. 27 depicts a further multi-sector reconstruction in accordance with aspects of the present disclosure.

In the second multi-sector implementation, depicted in FIG. 27, a single full-scan dataset may be initially built from all available data by weighting each contribution according to its phase offset. The dose may also be accounted for, but this may not be necessary since the dose will often be correlated with phase offset. Next, the full-scan reconstruction may be processed as discussed above to generate the desired imaging volume.

Technical effects of the invention include addressing artifacts attributable to one or more of truncation of data in the z-direction, mishandled data due to data redundancy, and/or missing frequency data. One technical effect includes generating reconstructions that are substantially uniform and substantially complete in frequency space from data that is missing some frequency information.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method of image data processing, comprising:
   reconstructing an initial subset of a fullscan axial projection dataset to generate a preliminary image;
   filtering the preliminary image to preserve a subset of the frequencies that are the most uniformly weighted to produce a partial reconstruction;
   repeating the acts of reconstruction and generating at shifted view ranges a specified number of times to generate a set of partial reconstructions; and
   combining the set of partial reconstructions to generate an intermediate volume with substantially complete frequency data.

2. The method of claim 1, wherein each initial subset of projection data comprises an axial scan of data over less than a full-scan.

3. The method of claim 1, wherein each initial subset of projection data is reconstructed over a 180 degree view range.

4. The method of claim 1, wherein generating the partial reconstruction comprises filtering the image to select only frequencies from a 18-45 degree range.

5. The method of claim 1, wherein the acts of reconstruction and generating are repeated at angular offsets to generate pairs of complementary partial reconstructions.

6. The method of claim 1, comprising:
   repeating the acts of reconstruction and filtering at shifted view ranges a specified number of times to generate a complementary set of partial reconstructions.

7. The method of claim 6, comprising:
   combining the set of partial reconstructions and the set of complementary partial reconstructions to generate a 360 degree view range of frequency data.

8. The method of claim 6, comprising:
   combining the complementary set of partial reconstructions to generate a complementary intermediate volume with substantially complete frequency data.

9. The method of claim 8, wherein the intermediate volume and the complementary intermediate volume taken together are equivalent to a full-scan reconstruction.

10. The method of claim 8, comprising:
    combining the intermediate volume and the complementary intermediate volume via filtering to generate one or more composite reconstruction built predominantly from a user-selected 180 degree view range.

11. The method of claim 10, further comprising:
    blending several composite reconstructions in the image domain in order to produce a volume that is substantially free from the effects of data truncation along the scanner axis.

12. A method for processing image data comprising:
    reconstructing a plurality of limited view angle reconstructions;
    summing the plurality of limited view angle reconstructions to generate a full-scan reconstruction;
    subtracting half of the limited view angle reconstructions from their conjugates prior to applying one of a plurality of first filters to generate filtered volumes;
    combining the filtered volumes to generate an intermediate volume;
    generating a temporal windowing volume from the intermediate volume; and
    combining the full-scan reconstruction with the temporal windowing volume.

13. The method of claim 12, wherein the plurality of limited view angle reconstructions is eight initial volumes.

14. The method of claim 12, wherein reconstructing the plurality of limited view angle reconstructions comprises backprojecting a different respective 45 degree view portion to generate each limited view angle reconstructions.

15. The method of claim 12, wherein applying the respective first filter comprises a multiplication in the Fourier domain.

16. The method of claim 12, wherein generating the temporal windowing volume comprises mixing in the image domain a plurality of filtered versions of the intermediate volume using the respective masks.

17. The method of claim 12, wherein each filtered volume comprises a two-dimensional Fourier domain volume.

18. A method for processing image data, comprising:
   accessing a fullscan axial projection dataset comprising a pair of views for every frequency direction for every voxel to be reconstructed;
   for each pair of views associated with each voxel and frequency direction, selecting a respective view that is closer in proximity to a particular view and processing each respective pair of views such that the respective view that is selected has a greater contribution in a corresponding reconstructed voxel at the corresponding frequency direction.

19. The method of claim 18, wherein the respective view of each pair of views that is selected contributes fully to the corresponding reconstructed voxel at the corresponding frequency direction while the view of each pair that is not selected does not contribute to the corresponding reconstructed voxel at the corresponding frequency direction.

20. The method of claim 18, wherein the particular view is a view acquired in a time range of relatively slow object motion.

21. The method of claim 18, wherein the particular view depends on the voxel location and is selected to be the view at which the selected voxel is measured by a ray with the smallest cone angle of all rays that pass through the voxel.

22. One or more non-transitory computer-readable media, encoding one or more routines which, when executed by a processor, cause the processor to perform acts comprising:
   reconstructing an initial subset of a fullscan axial projection dataset to generate a preliminary image;
   filtering the preliminary image to preserve a subset of the frequencies that is the most uniformly weighted to produce a partial reconstruction;
   repeating the acts of reconstruction and generating at shifted view ranges a specified number of times to generate a set of partial reconstructions; and
   combining the set of partial reconstructions to generate an intermediate volume with substantially complete frequency data.

23. An image processing system, comprising:
   a memory storing one or more routines; and
   a processing component configured to execute the one or more routines stored in the memory, wherein the one or more routines, when executed by the processing component:
      reconstruct an initial subset of a fullscan axial projection dataset to generate a preliminary image;
      filter the preliminary image to preserve a subset of the frequencies that is the most uniformly weighted to produce a partial reconstruction;
      repeat the acts of reconstruction and generating at shifted view ranges a specified number of times to generate a set of partial reconstructions; and
      combine the set of partial reconstructions to generate an intermediate volume with substantially complete frequency data.

24. One or more non-transitory computer-readable media, encoding one or more routines which, when executed by a processor, cause the processor to perform acts comprising:
   reconstructing a plurality of limited view angle reconstructions;
   summing the plurality of limited view angle reconstructions to generate a full-scan reconstruction;
   subtracting half of the limited view angle reconstructions from their conjugates prior to applying one of a plurality of first filters to generate filtered volumes;
   combining the filtered volumes to generate an intermediate volume;
   generating a temporal windowing volume from the intermediate volume; and
   combining the full-scan reconstruction with the temporal windowing volume.

25. One or more non-transitory computer-readable media, encoding one or more routines which, when executed by a processor, cause the processor to perform acts comprising:
   accessing a fullscan axial projection dataset comprising a pair of views for every frequency direction for every voxel to be reconstructed;
   for each pair of views associated with each voxel and frequency direction, selecting a respective view that is closer in proximity to a particular view and processing each respective pair of views such that the respective view that is selected has a greater contribution in a corresponding reconstructed voxel at the corresponding frequency direction.

26. An image processing system, comprising:
   a memory storing one or more routines; and
   a processing component configured to execute the one or more routines stored in the memory, wherein the one or more routines, when executed by the processing component:
      access a fullscan axial projection dataset comprising a pair of views for every frequency direction for every voxel to be reconstructed;
      for each pair of views associated with each voxel and frequency direction, select a respective view that is closer in proximity to a particular view and process each respective pair of views such that the respective view that is selected has a greater contribution in a corresponding reconstructed voxel at the corresponding frequency direction.

\* \* \* \* \*